(12) United States Patent
Higuchi et al.

(10) Patent No.: US 10,942,763 B2
(45) Date of Patent: Mar. 9, 2021

(54) OPERATION MANAGEMENT APPARATUS, MIGRATION DESTINATION RECOMMENDATION METHOD, AND STORAGE MEDIUM

(71) Applicant: FUJITSU LIMITED, Kawasaki (JP)

(72) Inventors: Junichi Higuchi, Kawasaki (JP); Takuto Tsuji, Kawasaki (JP); Ken Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 16/423,238

(22) Filed: May 28, 2019

(65) Prior Publication Data

US 2019/0391836 A1 Dec. 26, 2019

(30) Foreign Application Priority Data

Jun. 26, 2018 (JP) .............................. JP2018-120906

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01)

(58) Field of Classification Search
CPC ...................................................... G06F 9/505
See application file for complete search history.

(56) References Cited

U.S. PATENT DOCUMENTS 10,564,998 B1 * 2/2020 Gritter .................. G06F 9/5083
2009/0132840 A1 * 5/2009 Talwar .................. G06F 1/3203
713/320

FOREIGN PATENT DOCUMENTS

JP 2013-239095 11/2013
JP 2016-110248 6/2016

* cited by examiner

*Primary Examiner* — Charlie Sun
(74) *Attorney, Agent, or Firm* — Fujitsu Patent Center

(57) ABSTRACT

An operation management apparatus includes a processor. The processor generates a VM load model for each virtual machine running on an information processing system, generates resource utilization rate estimation data based on VM load models of a virtual machine group running on the physical machine and a VM load model of a first virtual machine, for each of physical machines except for a first physical machine on which the first virtual machine is running, generates a resource competition occurrence model based on the resource utilization rate of the physical machine, calculates a statistical value of competition occurrence probabilities of the resource, for each of the physical machines except for the first physical machine, based on the resource utilization rate estimation data and the resource competition occurrence model, specifies the migration destination physical machine based on the statistical value, and outputs information of a specified migration destination physical machine.

8 Claims, 30 Drawing Sheets

| DATE | TIME | UTILIZATION RATE [%] |
|---|---|---|
| 2017/5/7 | 9:00:00 | 20 |
| 2017/5/7 | 9:01:00 | 35 |
| 2017/5/7 | 9:02:00 | 30 |
| 2017/5/7 | 9:03:00 | 10 |
| 2017/5/7 | 9:04:00 | 8 |
| ⋮ | | |

| DATE | TIME | UTILIZATION RATE [%] |
|---|---|---|
| 2017/5/7 | 9:00:00 | 1.33 |
| 2017/5/7 | 9:01:00 | 1.88 |
| 2017/5/7 | 9:02:00 | 30.73 |
| 2017/5/7 | 9:03:00 | 90.18 |
| 2017/5/7 | 9:04:00 | 48.19 |
| ⋮ | | |

LOAD PROBABILITY DISTRIBUTION SHAPE DETERMINATION

LIKELIHOOD FUNCTION $L = \sum_{i=1}^{M} \log f(x_i)$ ...(2)

f: PROBABILITY DISTRIBUTION BY GROUP FOR CALCULATING MODEL
M: SCORE OF GROUP FOR DETERMINING APPROXIMATION DEGREE
ESTIMATION METHOD: GRID SEARCH

FIG. 5

| TARGET PERIOD | h (APPROXIMATION DEGREE OF MODEL) | CPU UTILIZATION RATE IN TARGET PERIOD [%] |
|---|---|---|
| MONDAY, 9:00 ~ 10:00 | 0.7 | [20, 35, 30, 10, 8, 4, 1] |
| MONDAY, 10:00 ~ 11:00 | 0.8 | [21, 10, 10, 45, 90, 84] |
| MONDAY, 11:00 ~ 12:00 | 4 | [5, 4, 6, 5, 1, 1] |
| ⋮ | | |

FIG. 6A

CONFIGURATION INFORMATION ON SERVER

| SERVER NAME | NUMBER OF CPUS | OVERCOM-MIT RATE | MEMORY AMOUNT [GB] | RUNNING VM LIST |
|---|---|---|---|---|
| SERVER#1 | 16 | 1 | 24 | VM#1, VM#2, VM#3 |
| SERVER#2 | 16 | 2 | 24 | VM#4, VM#5 |
| SERVER#3 | 32 | 1 | 48 | VM#6, VM#7, VM#8, VM#9 |
| SERVER#4 | 32 | 3 | 48 | VM#10, VM#11, VM#12, VM#13 |

FIG. 6B

CONFIGURATION INFORMATION ON VM

| VM NAME | REQUIRED NUMBER OF CPUS | REQUIRED MEMORY AMOUNT[GB] |
|---|---|---|
| VM#1 | 1 | 2 |
| VM#2 | 2 | 4 |
| VM#3 | 4 | 10 |
| VM#4 | 1 | 2 |
| VM#5 | 6 | 2 |

FIG. 7

| VM NAME | REQUIRED NUMBER OF CPUS | REQUIRED MEMORY AMOUNT [GB] |
|---|---|---|
| VM#1 | 2 | 12 |

FIG. 9A

SERVER #1

| TARGET PERIOD | CPU UTILIZATION RATE ESTIMATED BY SAMPLING [%], |
|---|---|
| MONDAY, 9:00 ~ 10:00 | [100, 23, 45, 3, 1, 2, 4] |
| MONDAY, 10:00 ~ 11:00 | [97, 14, 5, 30, 6, 5, 1] |
| MONDAY, 11:00 ~ 12:00 | [1, 8, 3, 90, 43, 2, 20] |
| ⋮ | ⋮ |

FIG. 9B

SERVER#2

| TARGET PERIOD | CPU UTILIZATION RATE ESTIMATED BY SAMPLING [%] |
|---|---|
| MONDAY, 9:00 ~ 10:00 | [1, 8, 3, 90, 43, 2, 20] |
| MONDAY, 10:00 ~ 11:00 | [100, 23, 45, 3, 1, 2, 4] |
| MONDAY, 11:00 ~ 12:00 | [100, 23, 45, 3, 1, 2, 4] |
| ⋮ | ⋮ |

FIG. 10

| DATE | TIME | CPU UTILIZATION RATE [%] |
|---|---|---|
| 2017/4/2 | 9:00:00 | 55 |
| 2017/4/2 | 9:01:00 | 52 |
| 2017/4/2 | 9:02:00 | 43 |
| 2017/4/2 | 9:03:00 | 48 |
| 2017/4/2 | 9:04:00 | 40 |
| ⋮ | ⋮ | ⋮ |

FIG. 11

| DATE | TIME | CPU UTILIZATION RATE [%] |
|---|---|---|
| 2017/4/2 | 9:00:00 | 72 |
| 2017/4/2 | 9:00:01 | 38 |
| 2017/4/2 | 9:00:02 | 51 |
| 2017/4/2 | 9:00:03 | 66 |
| 2017/4/2 | 9:00:04 | 88 |
| ⋮ | ⋮ | ⋮ |

RESOURCE COMPETITION OCCURRENCE PROBABILITY CALCULATION $$p_i = \frac{d_i}{c_i} \quad ...(4)$$

$p_i$: RESOURCE COMPETITION OCCURRENCE PROBABILITY IN $i^{th}$ STAGE (i=1, ..., 10)
$c_i$: NUMBER OF TIMES DETERMINATION IS MADE ON WHETHER RESOURCE COMPETITION HAS OCCURRED IN $i^{th}$ STAGE
$d_i$: NUMBER OF TIMES RESOURCE COMPETITION HAS OCCURRED IN $i^{th}$ STAGE

FIG. 13

| FUNCTION REPRESENTING MODEL | COEFFICIENT n |
|---|---|
| $p = \left(\dfrac{u}{100}\right)^n$ | 3 |

OPERATION MANAGEMENT APPARATUS, MIGRATION DESTINATION RECOMMENDATION METHOD, AND STORAGE MEDIUM

CROSS-REFERENCE TO RELATED APPLICATION

This application is based upon and claims the benefit of the prior Japanese Patent Application No. 2018-120906, filed on Jun. 26, 2018, the entire contents of which are incorporated herein by reference.

FIELD

The embodiments discussed herein are related to an operation management apparatus, a migration destination recommendation method, and a storage medium storing a migration destination recommendation program.

BACKGROUND

In a public cloud in which a plurality of users share the resources, a resource competition may occur among a plurality of virtual machines running on the same server (physical machine). Here, the resources include a central processing unit (CPU), a network, a disk, etc.

Due to the occurrence of the competition, the operation of the virtual machines on the same server becomes heavy, and the performance quality of user services is degraded. Thus, when the load of the server is increased, a migration of a virtual machine running on the server to another server is performed. A migration destination of the virtual machine is determined by evaluating a server based on a statistical value, such as, for example, an average value of resource utilization rates, on each day of the week and each time zone.

With respect to the migration of the virtual machine, there is a technology of improving aggregation efficiency by extracting a server whose service interruption time is determined to fall within an allowable service interruption time, as a migration destination server. In this technology, when it is expected that a usage resource amount of a server exceeds an upper threshold, virtual machine candidates as migration targets are extracted in an order from a virtual machine having the largest usage resource amount such that the usage resource amount of the server falls below the upper threshold. This improves resource utilization efficiency. When a usage resource amount of a server falls below a lower threshold for a predetermined time, the technology improves power usage efficiency by moving a virtual machine placed on the corresponding server to another server.

Also, there is a technology in which a virtualization execution device that executes virtualization of a plurality of server devices providing predetermined services to client devices improves the convenience of a virtualization environment of the server devices. The virtualization execution device stores characteristic information of users operating the client devices, and system configuration information of a system constituted by one or more virtual machines (VMs). Then, the virtualization execution device estimates a scheduled usage amount of a plurality of types of resources by a VM for each predetermined period by using the stored characteristic information and system configuration information. Then, the virtualization execution device uses the estimated scheduled usage amount of the plurality of types of resources so as to execute a placement optimization as to which of the plurality of server devices is to be used for placing the VM, and an allocation optimization as to which of a plurality of storage devices is to be allocated for a disk area required for an operation of the VM.

Related techniques are disclosed in, for example, Japanese Laid-open Patent Publication Nos. 2013-239095 and 2016-110248.

SUMMARY

According to an aspect of the embodiments, an operation management apparatus includes a memory; and a processor coupled to the memory and configured to: generate a virtual machine (VM) load model of a continuous probability distribution of a resource utilization rate of a virtual machine, for each virtual machine running on an information processing system, generate resource utilization rate estimation data that is data obtained by estimating a probability distribution of a resource utilization rate of a physical machine, based on VM load models of a virtual machine group running on the physical machine and a VM load model of a first virtual machine, for each of physical machines except for a first physical machine on which the first virtual machine is running, when an instruction for specifying a migration destination physical machine of the first virtual machine is received, generate a resource competition occurrence model that models a relationship between the resource utilization rate of the physical machine and a competition occurrence probability of a resource, based on the resource utilization rate of the physical machine, calculate a statistical value of competition occurrence probabilities of the resource, for each of the physical machines except for the first physical machine, based on the resource utilization rate estimation data and the resource competition occurrence model, specify the migration destination physical machine based on the statistical value calculated for each of the physical machines except for the first physical machine, and output information of a specified migration destination physical machine.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 3A and 3B are views illustrating an example of VM resource utilization rate data;

FIG. 5 is a view illustrating an example of information of a VM load model, which is stored by a VM load model memory, for each VM;

FIGS. 6A and 6B are views illustrating an example of configuration information;

FIG. 7 is a view illustrating an example of information of a migration target VM;

FIGS. 9A and 9B are views illustrating an example of resource utilization rate estimation data stored in an estimation data memory;

FIG. 10 is a view illustrating an example of resource utilization rate data,

FIG. 11 is a view illustrating an example of resource utilization rate data stored by a minute interval utilization rate memory, for each server;

FIG. 13 is a view illustrating an example of information of the resource competition occurrence model;

DESCRIPTION OF EMBODIMENTS

When a server is evaluated and a migration destination of a virtual machine is determined based on a statistical value, such as, for example, an average value of resource utilization rates on each day of the week and each time zone, there is a problem in that a resource competition occurs due to a temporary or spike-like high load since the resource utilization rate is rounded by a statistical processing.

Figure 28:
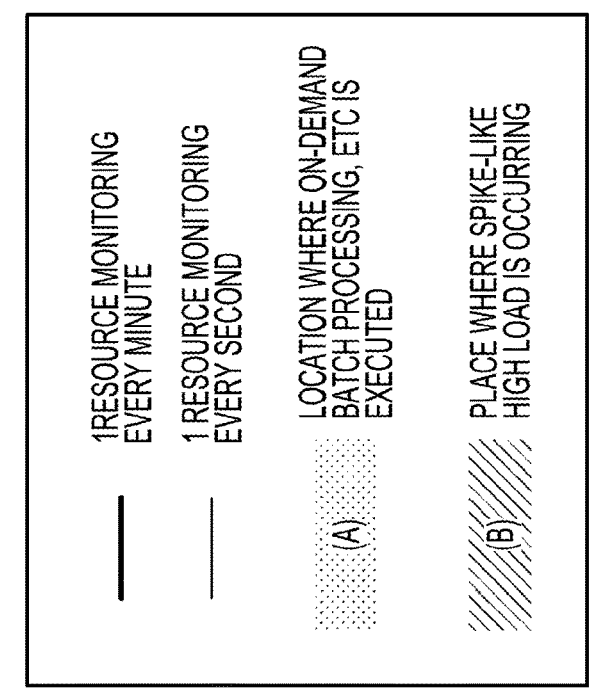
FIG. 28 is a view for explaining an occurrence of a resource competition due to a temporary or spike-like high load.
Figure 28:
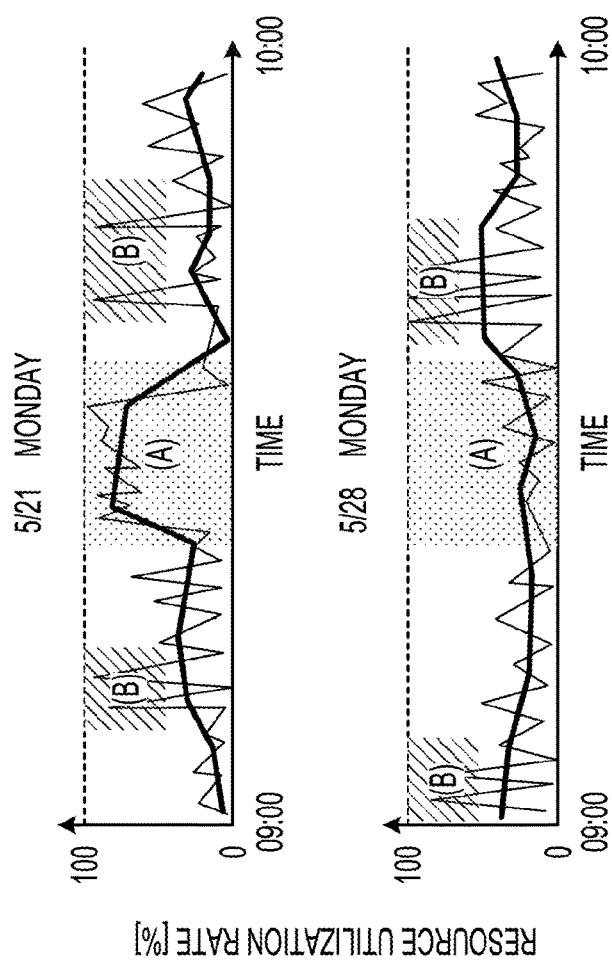

FIG. 28 is a view for explaining an occurrence of a resource competition due to a temporary or spike-like high load. As illustrated in portion (A) of FIG. 28, even on the same time zones of the same Mondays, a resource utilization rate monitored every minute is different between May 21 and May 28. This is because an on-demand batch processing, etc. is performed in portion (A), and in the on-demand batch processing, etc., a variation in a resource load of a VM is relatively large even on the same days of the week and the same time zones. For example, in a form output processing or a tabulation processing, a phenomenon called a resource high load occurs at a usage timing of a user. In this manner, when the resource high load occurs, a resource competition may occur. However, with respect to the resource utilization rates on each day of the week and each time zone, due to a statistical processing, such a temporary resource high load is neither specified nor used to evaluate a server of a migration destination.

As illustrated in portion (B) of FIG. 28, there is a spike-like high load that does not appear in a resource monitoring of every minute but appears in a resource monitoring of every second, and a resource competition occurs due to the spike-like high load. However, since the resource monitoring causes a relatively large overhead in a cloud infrastructure, the resource monitoring is not performed every second. Therefore, such a spike-like high load is neither specified nor used to evaluate a server of a migration destination. The cloud infrastructure is an infrastructure that provides resources included in a cloud system through virtualization.

Hereinafter, detailed descriptions will be made on an embodiment of an operation management apparatus, a migration destination recommendation method, and a migration destination recommendation program according to the present disclosure, with reference to the accompanying drawings. This embodiment does not limit the disclosed technology.

Embodiment

Figure 1:
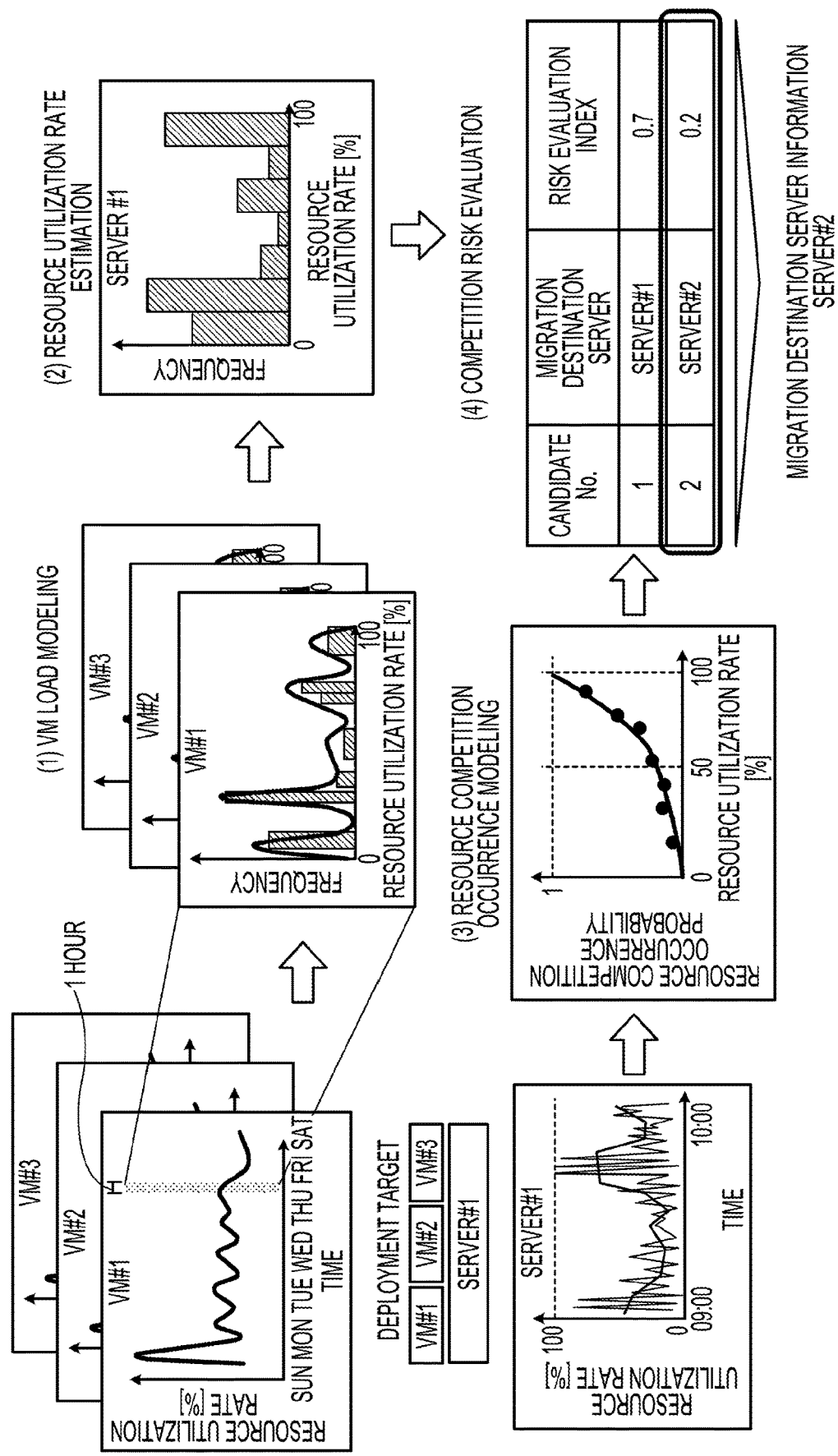
FIG. 1 is a view for explaining a method of specifying a VM migration destination by a cloud infrastructure management apparatus according to an embodiment.

First, descriptions will be made on a method of specifying a VM migration destination by a cloud infrastructure management apparatus according to the embodiment. FIG. 1 is a view for explaining the method of specifying the VM migration destination by the cloud infrastructure management apparatus according to the embodiment. As illustrated in FIG. 1, the cloud infrastructure management apparatus according to the embodiment models resource utilization rates on each day of the week and each time zone with a continuous probability distribution, for each VM, so as to create a VM load model (1). For example, the cloud infrastructure management apparatus according to the embodiment models resource utilization rates every hour, with a continuous probability distribution. In FIG. 1, for a VM#1 to a VM#3, VM load models are created every hour. The unit of the resource utilization rate is %.

Then, upon receiving an instruction of specifying a migration destination server of a migration target VM, the cloud infrastructure management apparatus according to the embodiment creates resource utilization rate estimation data of a server, for each server, based on VM load models of a VM running on the server and the migration target VM (2). Here, the resource utilization rate estimation data is data obtained by estimating a probability distribution of resource utilization rates in a case where the migration target VM is moved to the server. The cloud infrastructure management apparatus according to the embodiment creates the resource utilization rate estimation data on each day of the week and each time zone. In FIG. 1, for example, when it is assumed that the VM#1 is the migration target VM, and the VM#2 and the VM#3 are running on a server#1, resource utilization rate estimation data of the server#1 is created based on the VM load models of the VM#1 to the VM#3. The resource utilization rate estimation data is also created for other servers such as a server#2.

The cloud infrastructure management apparatus according to the embodiment creates a resource competition occurrence model that models the relationship between a resource utilization rate of a server and a resource competition occurrence probability, by using the resource utilization rate of the server (3). When creating the resource competition occurrence model, the cloud infrastructure management apparatus according to the embodiment uses not only resource utilization rates at general monitoring intervals, but also resource utilization rates at minute intervals smaller than the monitoring intervals. For example, when the monitoring interval is set as one minute, the minute interval is one sec.

Then, the cloud infrastructure management apparatus according to the embodiment evaluates a resource competition risk for each server based on the resource utilization rate estimation data and the resource competition occurrence model, and then specifies a migration destination server based on the competition risk so as to display information on the migration destination server on a display device (4). In FIG. 1, the risk evaluation index of the server#1 is evaluated as "0.7," the risk evaluation index of the server#2 is evaluated as "0.2," and the server#2 is specified as the migration destination server. Here, the risk evaluation index is an index indicating an evaluation result of the resource competition risk, and the smaller the value, the smaller the competition risk. Then, the cloud infrastructure management apparatus according to the embodiment displays information of the server #2, as information of the migration destination server.

In this manner, the cloud infrastructure management apparatus according to the embodiment specifies a migration destination server based on a probability distribution of resource utilization rates, and thus may specify the server as a migration destination of a virtual machine such that a resource competition may be suppressed from occurring by a temporary high load. The cloud infrastructure management apparatus according to the embodiment specifies a migration destination server based on resource utilization rates at minute intervals, and thus may specify the server as a migration destination of a virtual machine such that a resource competition may be suppressed from occurring by a spike-like high load.

Figure 2:
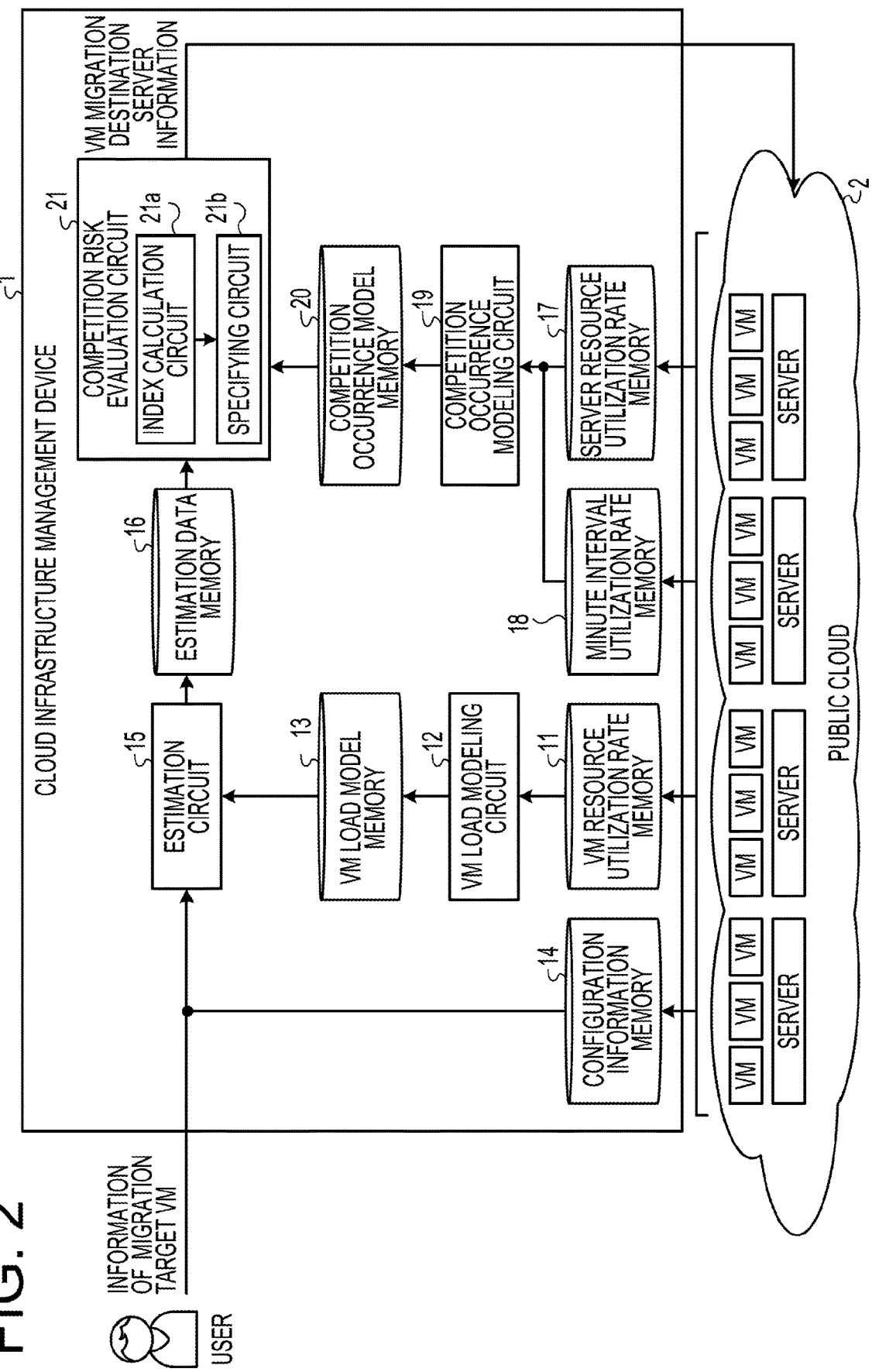
FIG. 2 is a view illustrating a functional configuration of the cloud infrastructure management apparatus according to the embodiment.

Hereinafter, descriptions will be made on a functional configuration of the cloud infrastructure management apparatus according to the embodiment. FIG. 2 is a view illustrating a functional configuration of the cloud infrastructure management apparatus according to the embodiment. As illustrated in FIG. 2, a cloud infrastructure management apparatus 1 according to the embodiment includes a VM resource utilization rate memory 11, a VM load modeling circuit 12, a VM load model memory 13, a configuration information memory 14, and an estimation circuit 15. The cloud infrastructure management apparatus 1 includes an estimation data memory 16, a server resource utilization rate memory 17, a minute interval utilization rate memory 18, a competition occurrence modeling circuit 19, a competition occurrence model memory 20, and a competition risk evaluation circuit 21.

The VM resource utilization rate memory 11 stores resource utilization rates as VM resource utilization rate data, for each VM, at fixed time intervals. The resource utilization rates of the VM are collected from a server on which the VM included in a public cloud 2 operates. FIGS. 3A and 3B are views illustrating an example of the VM resource utilization rate data. The following descriptions will be made based on a case where the resources are CPUs. FIG. 3A illustrates VM resource utilization rate data of the VM#1, and FIG. 3B illustrates VM resource utilization rate data of the VM#2. As illustrated in FIGS. 3A and 3B, the VM resource utilization rate memory 11 stores the date, the time, and the CPU utilization rate at one-minute intervals, for each VM.

The date and the time are the date and the time when the CPU utilization rate was collected. The CPU utilization rate is a rate at which the VM used the CPU. The unit of the CPU utilization rate is percent (%). For example, at 9 o'clock on May 7, 2017, the CPU utilization rate of the VM#1 is 20%.

Figure 4A:
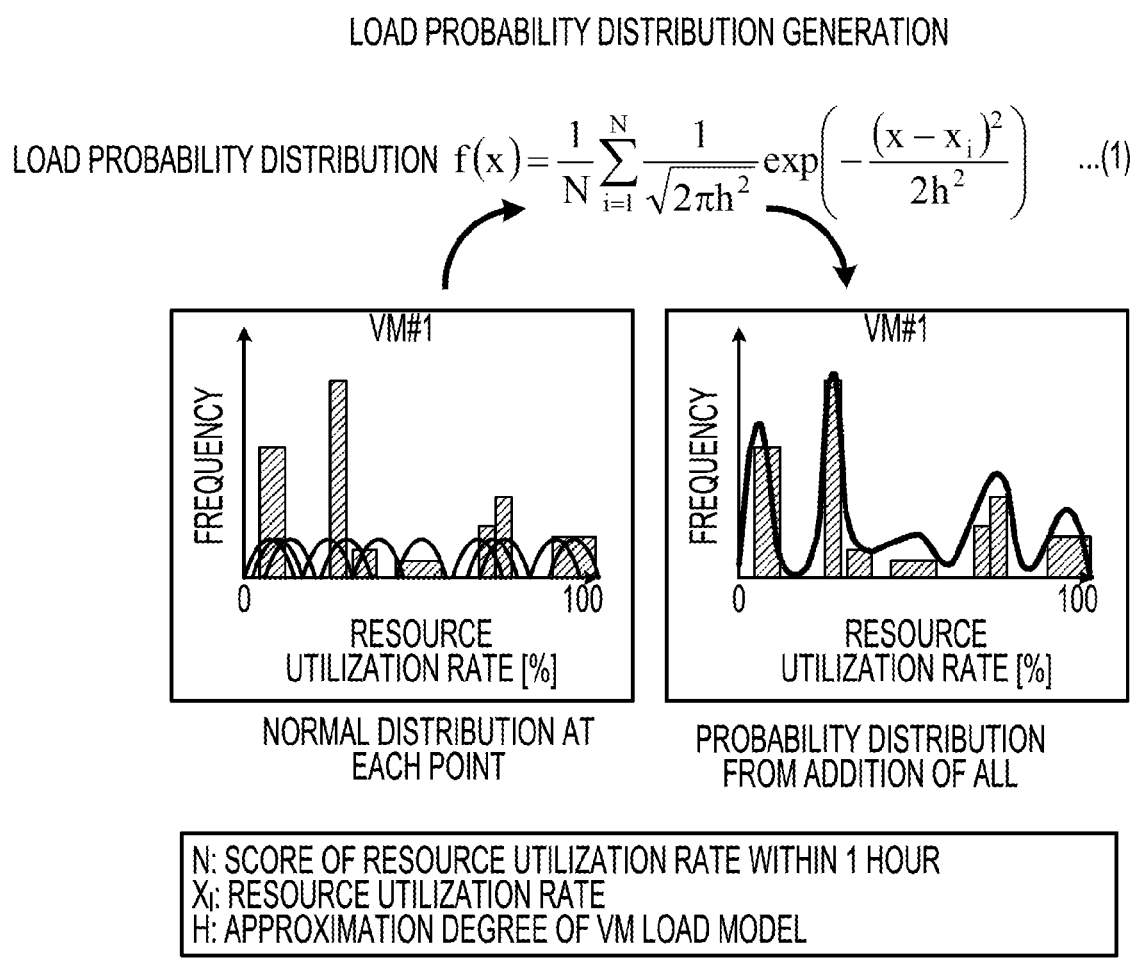
FIG. 4A is a view for explaining generation of a load probability distribution of a VM.
Figure 4B:
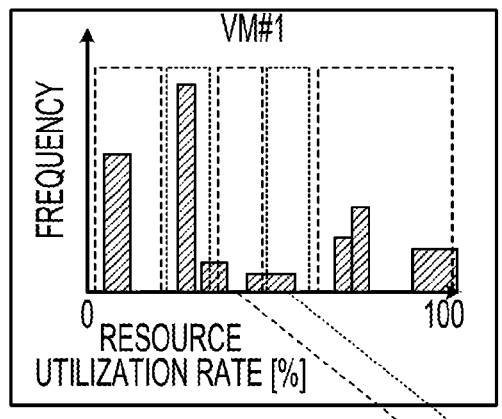
FIG. 4B is a view for explaining shape determination of the load probability distribution of a VM.

The VM load modeling circuit 12 generates a load probability distribution of the VM based on the VM resource utilization rate data, on each day of the week and each time zone, and determines the shape of the generated load probability distribution, thereby creating a VM load model. FIG. 4A is a view for explaining generation of a load probability distribution of the VM, and FIG. 4B is a view for explaining a shape determination of the load probability distribution.

The VM load modeling circuit 12 generates the load probability distribution by kernel density estimation so as to express shapes of various probability distributions. That is, as illustrated in FIG. 4A, the VM load modeling circuit 12 generates a probability density function of the resource utilization rates, as the load probability distribution, by associating a normal distribution with each point of the resource utilization rate and adding all normal distributions with respect to the resource utilization rates, for example, within one hour.

Specifically, the VM load modeling circuit 12 calculates

[Equation 1]

$$f(x) = \frac{1}{N} \sum_{i=1}^{N} \frac{1}{\sqrt{2\pi h^2}} \exp\left(-\frac{(x-x_i)^2}{2h^2}\right), \quad (1)$$

thereby generating the load probability distribution. In the equation (1), N is the score of the resource utilization rate $x_i$ within one hour, and h is a parameter indicating the approximation degree of a VM load model. FIG. 4A illustrates a load probability distribution of the VM#1.

The VM load modeling circuit 12 divides the resource utilization rates $x_i$ into a group for calculating a VM load model and a group for determining an approximation degree, through cross validation, and calculates a likelihood function by using the two groups. That is, as illustrated in FIG. 4B, the VM load modeling circuit 12 calculates a probability distribution f by using the resource utilization rates $x_i$ in the group for calculating the model, and calculates a likelihood function L by using the resource utilization rates $x_i$ in the group for determining the approximation degree.

Specifically, the VM load modeling circuit 12 calculates

[Equation 2]

$$L = \sum_{i=1}^{M} \log f(x_i), \quad (2)$$

thereby calculating the likelihood function L. In the equation (2), M is a score of the resource utilization rate $x_i$ in the group for determining the approximation degree.

Then, the VM load modeling circuit 12 calculates the likelihood functions L while changing a group division, and estimates h by which the likelihood function L is maximized by using a grid search as an estimation method so as to determine the shape of the load probability distribution.

The VM load model memory 13 stores information of the VM load model created by the VM load modeling circuit 12, for each VM. FIG. 5 is a view illustrating an example of information of the VM load model, which is stored by the VM load model memory 13, for each VM. As illustrated in FIG. 5, the VM load model memory 13 stores a target period, h, and a CPU utilization rate within the target period, for each VM, for one week while shifting the target period by one hour. That is, the VM load model memory 13 stores h, and the CPU utilization rate on the target day and the target time zone on each day of the week and each time zone.

The target period corresponds to a day of the week and a time zone of the VM load model. The CPU utilization rate within the target period is a CPU utilization rate used to create the VM load model. For example, on the time zone from 9 o'clock to 10 o'clock on Monday, the approximation degree of the VM load model is 0.7, and the CPU utilization rates used to create the VM load model are 20%, 35%, 30%, 10%, 8%, 4%, and 1%.

The configuration information memory 14 stores configuration information of a public cloud 2. FIGS. 6A and 6B are views illustrating an example of configuration information. FIG. 6A is configuration information on servers, and FIG. 6B is configuration information on VMs. As illustrated in FIG. 6A, the configuration information on the servers includes a server name, the number of CPUs, an overcommit rate, a memory amount, and a running VM list.

The server name is a name that identifies a server. The number of CPUs is the number of CPUs included in the server. The overcommit rate is (the total number of CPUs allocatable to VMs)/(the total number of CPUs included in the server). In general, it cannot be said that 100% of VMs runs, and thus it is possible to allocate more CPUs than the total number of CPUs included in the server, to the VMs. The memory amount is a capacity of a main memory included in the server. The unit of the memory amount is gigabyte (GB). The running VM list indicates names of VMs running on the server.

For example, the server#1 has 16 CPUs and a 24 GB-main memory. The overcommit rate of the server#1 is 1, and the VM#1, the VM#2, and the VM#3 run on the server#1.

As illustrated in FIG. 6B, the configuration information on the VMs includes a VM name, the required number of CPUs, and a required memory amount. The VM name is a name that identifies a VM. The required number of CPUs is the number of CPUs required for running the VM. The required memory amount is an amount of the main memory required for running the VM. The unit of the required memory amount is GB. For example, the VM#1 requires one CPU and a 2 GB-main memory in running.

Upon accepting a specification instruction of a migration destination server together with information of a migration target VM from a user, the estimation circuit 15 creates resource utilization rate estimation data of each server on each day of the week and each time zone based on the VM load model memory 13 and the configuration information memory 14.

FIG. 7 is a view illustrating an example of information of a migration target VM. As illustrated in FIG. 7, the information of the migration target VM includes a VM name, the required number of CPUs, and a required memory amount. The VM name is a name of a migration target VM. The required number of CPUs is the number of CPUs required for running the migration target VM. The required memory amount is an amount of the main memory required for running the migration target VM. The unit of the required memory amount is GB. For example, in FIG. 7, the migration target VM is the VM#1 that requires two CPUs and a 12 GB-main memory in running.

Figure 8:
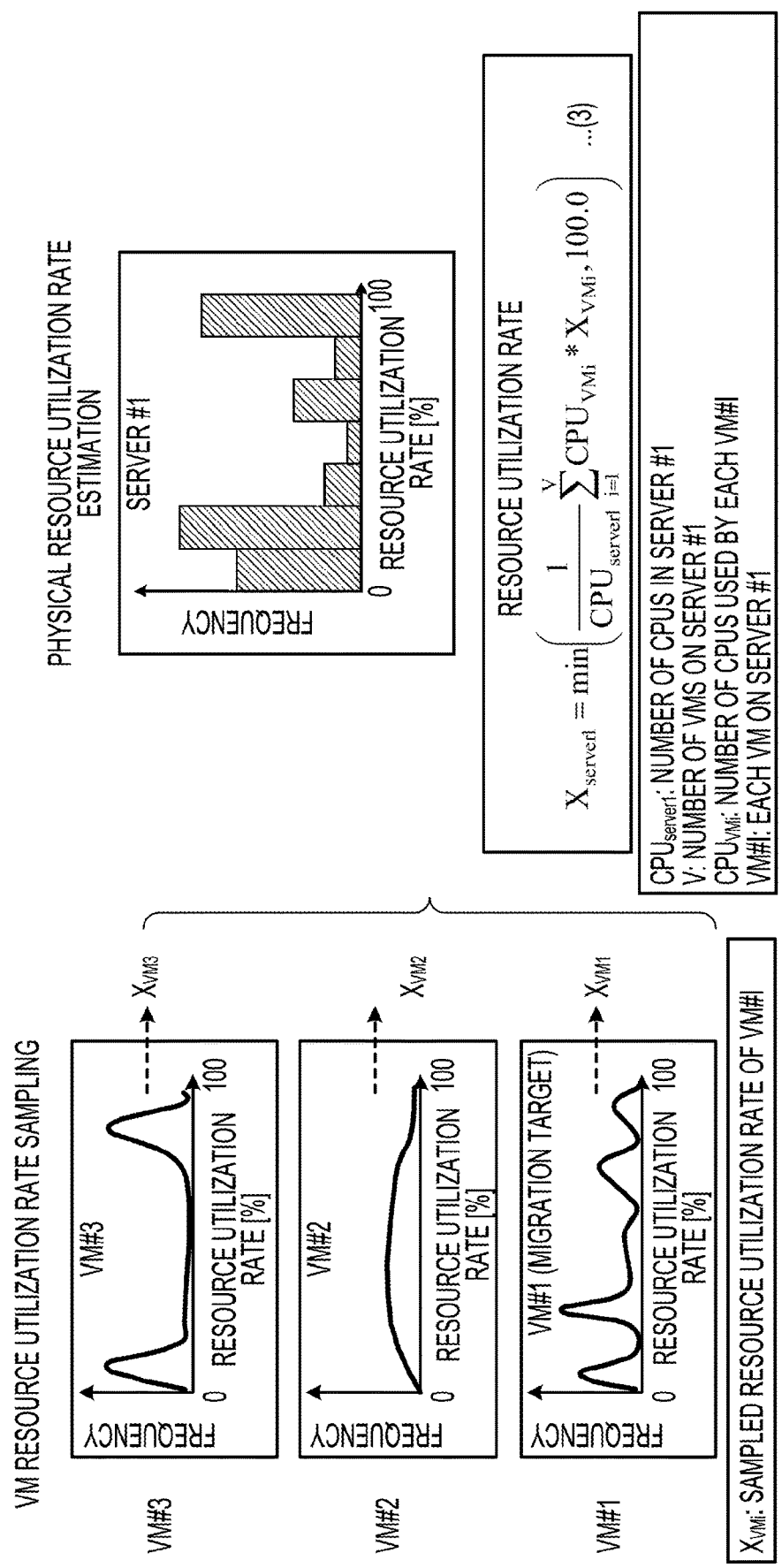
FIG. 8 is a view for explaining a method of creating resource utilization rate estimation data.

FIG. 8 is a view for explaining a method of creating resource utilization rate estimation data. As illustrated in FIG. 8, the estimation circuit 15 calculates resource utilization rates of a server by sampling resource utilization rates from VM load models of VMs running on the server, and repeats this calculation so as to create resource utilization rate estimation data. The estimation circuit 15 calculates the resource utilization rates of the server on each day of the week and each time zone, by using the VM load models on each day of the week and each time zone. The estimation circuit 15 creates the resource utilization rate estimation data for each server.

In FIG. 8, resource utilization rate estimation data of the server#1 is created. For example, on the server#1, the VM#2 and the VM#3 are running, and the VM#1 is a migration target VM. When the resource utilization rate estimation data is calculated from all combinations of resource utilization rates of VMs scheduled to be mounted in the server, calculation is not finished in practical time. Thus, the estimation circuit 15 samples resource utilization rates of a VM from each VM load model.

The estimation circuit 15 performs sampling by using a method of sampling from a continuous distribution, such as, for example, Markov Chain Monte Carlo methods (MCMC methods). The estimation circuit 15 sets the probability of a resource utilization rate outside the [0, 100] range, to 0, in order to prevent sampling of data that is absolutely not observed.

A resource utilization rate $X_{VM1}$ of the VM#1 is sampled from the VM load model of the VM#1, a resource utilization rate $X_{VM2}$ of the VM#2 is sampled from the VM load model of the VM#2, and a resource utilization rate $X_{VM3}$ of the VM#3 is sampled from the VM load model of the VM#3. Then, the estimation circuit 15 calculates a resource utilization rate $X_{server1}$ of the server#1 by using the following equation (3).

[Equation 3]

$$X_{server1} = \min\left(\frac{1}{CPU_{server1}} \sum_{i=1}^{V} CPU_{VMi} * X_{VMi}, 100.0\right) \quad (3)$$

In the equation (3), $CPU_{server1}$ is the number of CPUs in the server#1, V is the number of VMs on the server#1, $CPU_{VMi}$ is the number of CPUs used by each VM#i, and VM#i is a VM on the server#1. In FIG. 8, V is 3. In the equation (3), a value smaller than 100 is taken in order to prevent $X_{server1}$ from exceeding 100%. The estimation circuit 15 calculates resource utilization rates, for each server.

The estimation data memory 16 stores the resource utilization rate estimation data calculated by the estimation circuit 15 on each day of the week and each time zone. The estimation data memory 16 stores the resource utilization rate estimation data, for each server. Meanwhile, when there is a sampled resource utilization rate $X_{VMi}$, it is possible to calculate the resource utilization rate estimation data of a server by using the configuration information and the equation (3). Therefore, the estimation data memory 16 may store the sampled resource utilization rate as the resource utilization rate estimation data.

FIGS. 9A and 9B are views illustrating an example of the resource utilization rate estimation data stored in the estimation data memory 16. FIG. 9A illustrates resource utilization rate estimation data of the server#1, and FIG. 9B illustrates resource utilization rate estimation data of the server#2. As illustrated in FIGS. 9A and 9B, the resource utilization rate estimation data includes a target period and a CPU utilization rate estimated by sampling. The target period corresponds to a day of the week and a time zone of the resource utilization rate estimation data. The CPU utilization rate estimated by sampling is a resource utilization rate sampled from VM load models by the estimation circuit 15. For example, for the server#1, in a target period from 9 o'clock to 10 o'clock on Monday, resource utilization rates sampled from the VM load models are 100%, 23%, 45%, 3%, 1%, 2%, and 4%.

The server resource utilization rate memory 17 stores resource utilization rates of a server at fixed time intervals, as resource utilization rate data, for each server. Here, the resource utilization rate is a ratio of resources of the server with respect to resources usable by VMs. FIG. 10 is a view illustrating an example of the resource utilization rate data. FIG. 10 illustrates resource utilization rate data of the server#1.

As illustrated in FIG. 10, the resource utilization rate data includes a date, a time, and a CPU utilization rate. The date and the time are a date and a time when a CPU utilization rate was collected. In FIG. 10, resource utilization rates are collected at one-minute intervals. The CPU utilization rate is a rate at which the server used CPUs. The unit of the CPU utilization rate is percent (%). For example, at 9 o'clock on Apr. 2, 2017, the CPU utilization rate of the server#1 is 55%.

The minute interval utilization rate memory 18 stores resource utilization rate data at time intervals shorter than that of the resource utilization rate data stored by the server resource utilization rate memory 17, for each server. Here, the time interval at which the minute interval utilization rate memory 18 stores the resource utilization rates is called a minute interval, and the time interval at which the server resource utilization rate memory 17 stores the resource utilization rates is called a normal interval.

FIG. 11 is a view illustrating an example of the resource utilization rate data stored by the minute interval utilization rate memory 18, for each server. As illustrated in FIG. 11, the minute interval utilization rate memory 18 stores CPU utilization rates at one-second intervals. In this example, the minute interval utilization rate memory 18 stores the CPU utilization rates at a time interval of 1/60 as compared to the server resource utilization rate memory 17.

The competition occurrence modeling circuit 19 calculates a resource competition occurrence probability based on the server resource utilization rate memory 17 and the minute interval utilization rate memory 18, and generates a resource competition occurrence model which approximates to the calculated occurrence probability.

The competition occurrence modeling circuit 19 detects occurrence of resource competition by using minute-interval resource utilization rates, and determines whether the resource competition has occurred based on whether occurrence of the resource competition has been detected even once at a normal interval, in each stage of discretized resource utilization rates. Here, the competition occurrence modeling circuit 19 determines the stages of resource utilization rates based on resource utilization rates at normal intervals. Then, the competition occurrence modeling circuit 19 repeats determination on whether the resource competition has occurred at a normal interval, for a plurality of normal intervals, so as to calculate a resource competition occurrence probability.

Figure 12A:
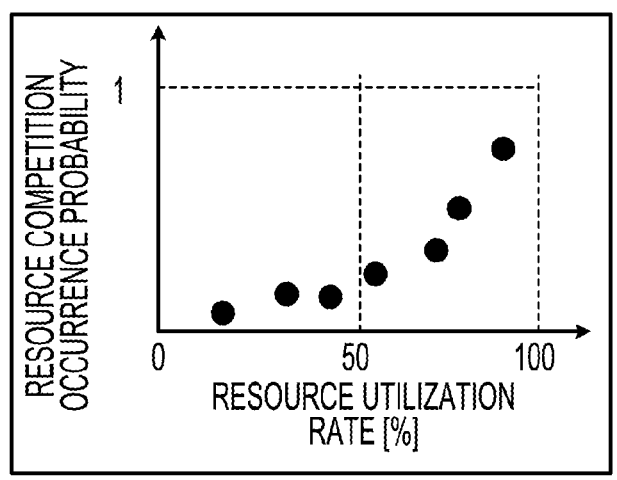
FIG. 12A is a view for explaining calculation of a resource competition occurrence probability.

FIG. 12A is a view for explaining calculation of a resource competition occurrence probability. In FIG. 12A, resource utilization rates are discretized in ten stages. As illustrated in FIG. 12A, a resource competition occurrence probability $p_i$ in the $i^{th}$ (i=1, ..., 10) stage is calculated by the following equation (4).

[Equation 4]

$$p_i = \frac{d_i}{c_i} \quad (4)$$

In the equation (4), $c_i$ is the number of times determination is made on whether the resource competition has occurred in the $i^{th}$ stage, and $d_i$ is the number of times it is determined that the resource competition has occurred in the $i^{th}$ stage.

Then, the competition occurrence modeling circuit 19 creates a resource competition occurrence model which approximates to the resource competition occurrence probability calculated in each stage so as to express a characteristic that as the resource utilization rate approaches 100%, the increase rate of the resource competition occurrence probability is also increased. For example, the competition occurrence modeling circuit 19 causes the resource competition occurrence probability calculated in each stage to approximate to a power function by using a least squares method, etc.

Figure 12B:
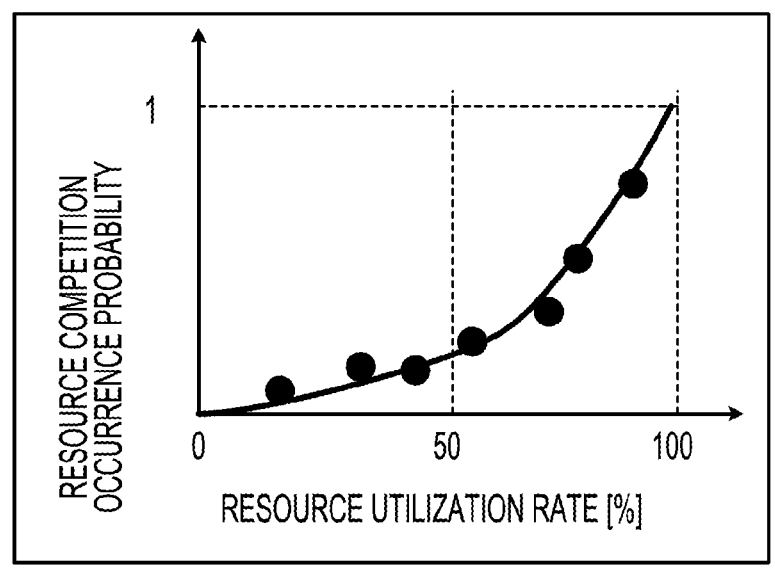
FIG. 12B is a view for explaining generation of a resource competition occurrence model.

FIG. 12B is a view for explaining generation of the resource competition occurrence model. As illustrated in FIG. 12B, the competition occurrence modeling circuit 19 approximates the resource competition occurrence probability calculated in each stage, by the equation (5).

[Equation 5]

$$p = \left(\frac{u}{100}\right)^n \quad (5)$$

In the equation (5), p is a resource competition occurrence probability, u is a resource utilization rate of a server, and n is a coefficient of 1 or more.

The competition occurrence model memory 20 stores information of a resource competition occurrence model. FIG. 13 is a view illustrating an example of the information of the resource competition occurrence model. As illustrated in FIG. 13, the information of the resource competition occurrence model includes a function representing a model and a coefficient n. In FIG. 13, the function representing the model is a function represented in the equation (5), and the coefficient n is 3.

The competition risk evaluation circuit 21 calculates an expected value of a probability that resource competition occurs, based on the estimation data memory 16 and the competition occurrence model memory 20, and calculates a risk evaluation index of evaluating a risk of resource competition occurrence, based on the calculated expected value, for each server. Then, the competition risk evaluation circuit 21 specifies a migration destination server based on the calculated risk evaluation index, and displays information of the specified migration destination server, on a display device.

The competition risk evaluation circuit 21 includes an index calculation circuit 21a and a specifying circuit 21b. The index calculation circuit 21a calculates a resource competition occurrence probability expected value on each day of the week and each time zone by using the resource utilization rate estimation data and the resource competition occurrence model, for each server. The index calculation circuit 21a calculates an average value of resource competition occurrence probabilities by using the entire resource utilization rate estimation data on each day of the week and each time zone so as to calculate the resource competition occurrence probability expected value on each day of the week and each time zone. Then, the index calculation circuit 21a calculates a risk evaluation index based on the resource competition occurrence probability expected value on each day of the week and each time zone, for each server.

The specifying circuit 21b specifies a server having the smallest risk evaluation index, as a migration destination server, and displays information of the specified migration destination server.

Figure 14:
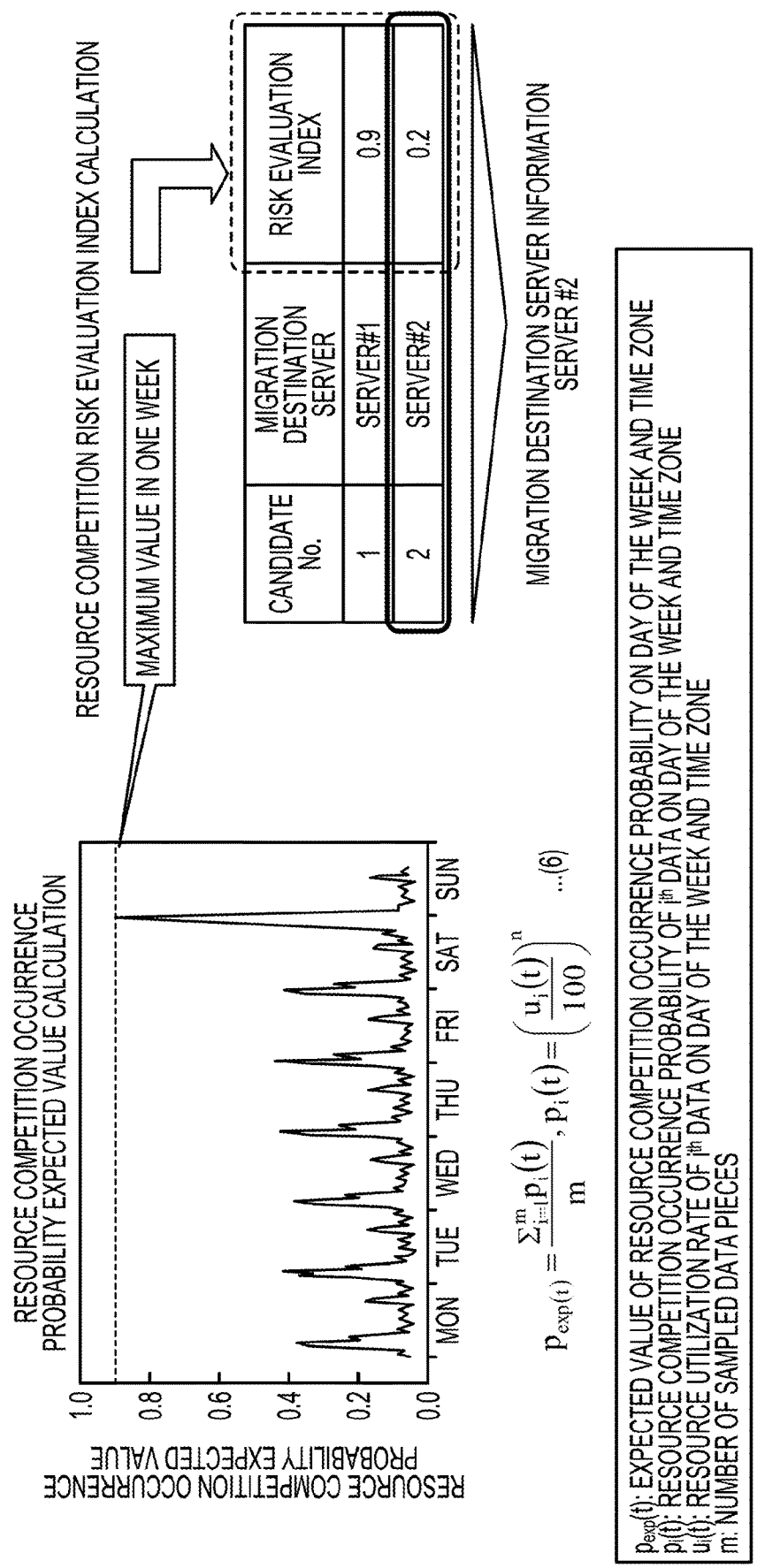
FIG. 14 is a view for explaining a processing by a competition risk evaluation circuit.

FIG. 14 is a view for explaining a processing by the competition risk evaluation circuit 21. As illustrated in FIG. 14, the competition risk evaluation circuit 21 calculates the resource competition occurrence probability expected value on each day of the week and each time zone by using the following equation (6).

[Equation 6]

$$p_{exp(t)} = \frac{\sum_{i=1}^{m} p_i(t)}{m}, \quad p_i(t) = \left(\frac{u_i(t)}{100}\right)^n \quad (6)$$

In the equation (6), $p_{exp(t)}$ is an expected value of a resource competition occurrence probability on a day of the week and a time zone t, and $p_i(t)$ is a resource competition occurrence probability of $i^{th}$ data in resource utilization rate estimation data on the day of the week and the time zone t. $u_i(t)$ is a resource utilization rate of the $i^{th}$ data in the resource utilization rate estimation data on the day of the week and the time zone t, and m is the number of resource utilization rate estimation data pieces on the day of the week and the time zone t. m is the number of sampled data pieces which are independent from the day of the week and the time zone t.

Then, the competition risk evaluation circuit 21 calculates a statistical value of resource competition occurrence probability expected values in one week, as a risk evaluation index. The statistical value is a maximum value, an average value, a standard deviation, or a combination thereof, etc. The competition risk evaluation circuit 21 calculates the risk evaluation index, for each server. In FIG. 14, a risk evaluation index of the server#1 is calculated as 0.9, and a risk evaluation index of the server #2 is calculated as 0.2.

Then, the competition risk evaluation circuit 21 specifies a server having the smallest risk evaluation index as a migration destination server, and outputs information of the specified migration destination server. In FIG. 14, since the risk evaluation index of the server#2 is smaller than that of the server#1, the server#2 is specified as the migration destination server, and "server#2" is displayed as information of the migration destination server. The competition risk evaluation circuit 21 may give priorities in an ascending order of the risk evaluation index so as to display information of a plurality of migration destination servers.

Figure 15:
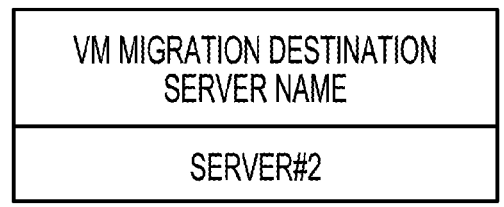
FIG. 15 is a view illustrating an example of VM migration destination server information.

FIG. 15 is a view illustrating an example of VM migration destination server information. As illustrated in FIG. 15, the VM migration destination server information includes a VM migration destination server name. In FIG. 15, a VM migration destination server is the server#2.

Figure 16:
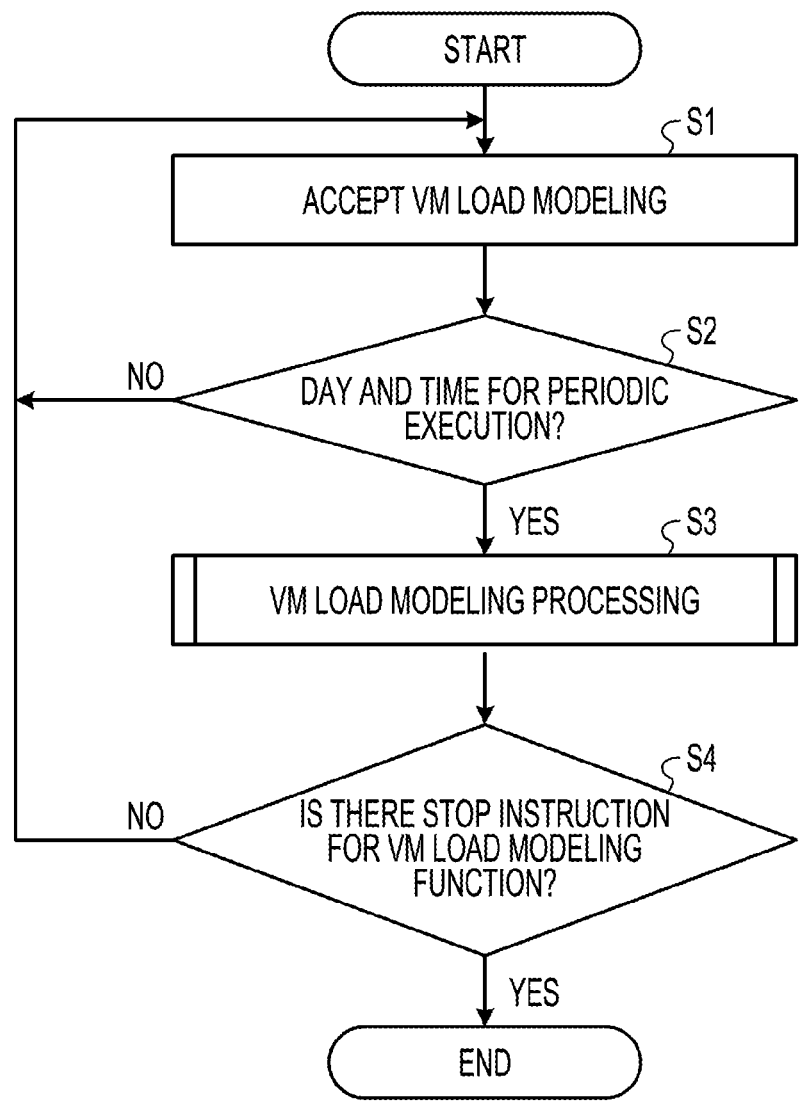
FIG. 16 is a flowchart illustrating the flow of a processing by a VM load modeling circuit.

Hereinafter, descriptions will be made on the flow of a processing by the cloud infrastructure management apparatus 1, with reference to FIGS. 16 to 26. FIG. 16 is a flow chart illustrating the flow of a processing by the VM load modeling circuit 12. As illustrated in FIG. 16, the VM load modeling circuit 12 is in a state where VM load modeling is accepted (step S1), and determines whether it is a day of the week and a time for periodic execution (step S2). For example, periodic execution is performed at 4 o'clock every Sunday.

Then, when it is determined that it is not a day of the week for periodic execution or not a time for periodic execution, the VM load modeling circuit 12 continues to be in a state where the VM load modeling is accepted. Meanwhile, when it is determined that it is a day of the week and a time for periodic execution, the VM load modeling circuit 12 performs a VM load modeling processing of creating a VM load model (step S3). Then, the VM load modeling circuit 12 determines whether there is a stop instruction for a VM load modeling function (step S4). When it is determined that there is no stop instruction, the process returns to step S1. When it is determined that there is a stop instruction, the process ends.

In this manner, the VM load modeling circuit 12 may periodically perform the VM load modeling processing so as to create the VM load model.

Figure 17:
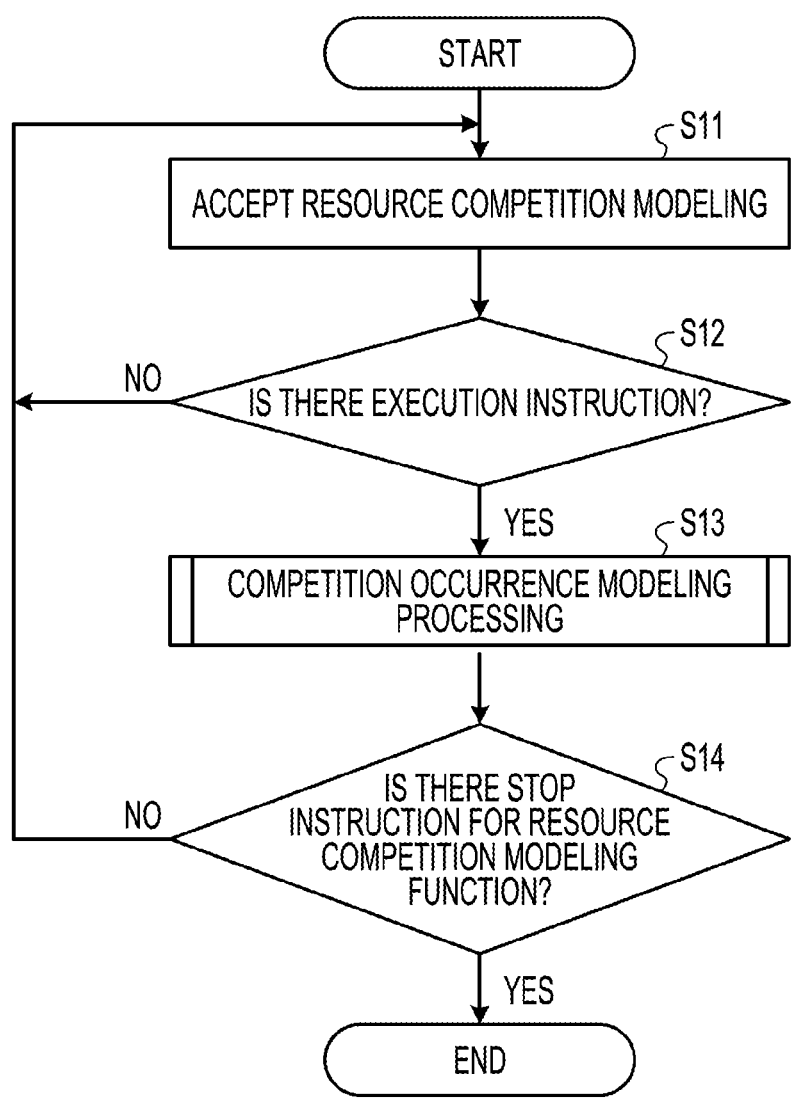
FIG. 17 is a flowchart illustrating the flow of a processing by a competition occurrence modeling circuit.

FIG. 17 is a flowchart illustrating the flow of a processing by the competition occurrence modeling circuit 19. As illustrated in FIG. 17, the competition occurrence modeling circuit 19 is in a state where resource competition modeling is accepted (step S11), and determines whether there is an execution instruction (step S12). Then, when it is determined that there is no execution instruction, the competition occurrence modeling circuit 19 continues to be in a state where the resource competition modeling is accepted.

Meanwhile, when it is determined that there is an execution instruction, the competition occurrence modeling circuit 19 performs a competition occurrence modeling processing of creating a resource competition occurrence model (step S13). Then, the competition occurrence modeling circuit 19 determines whether there is a stop instruction for a resource competition modeling function (step S14). When it is determined that there is no stop instruction, the process returns to step S11. When it is determined that there is a stop instruction, the process ends.

In this manner, the competition occurrence modeling circuit 19 may create the resource competition occurrence model by performing the competition occurrence modeling processing when it is determined that there is an execution instruction.

Figure 18:
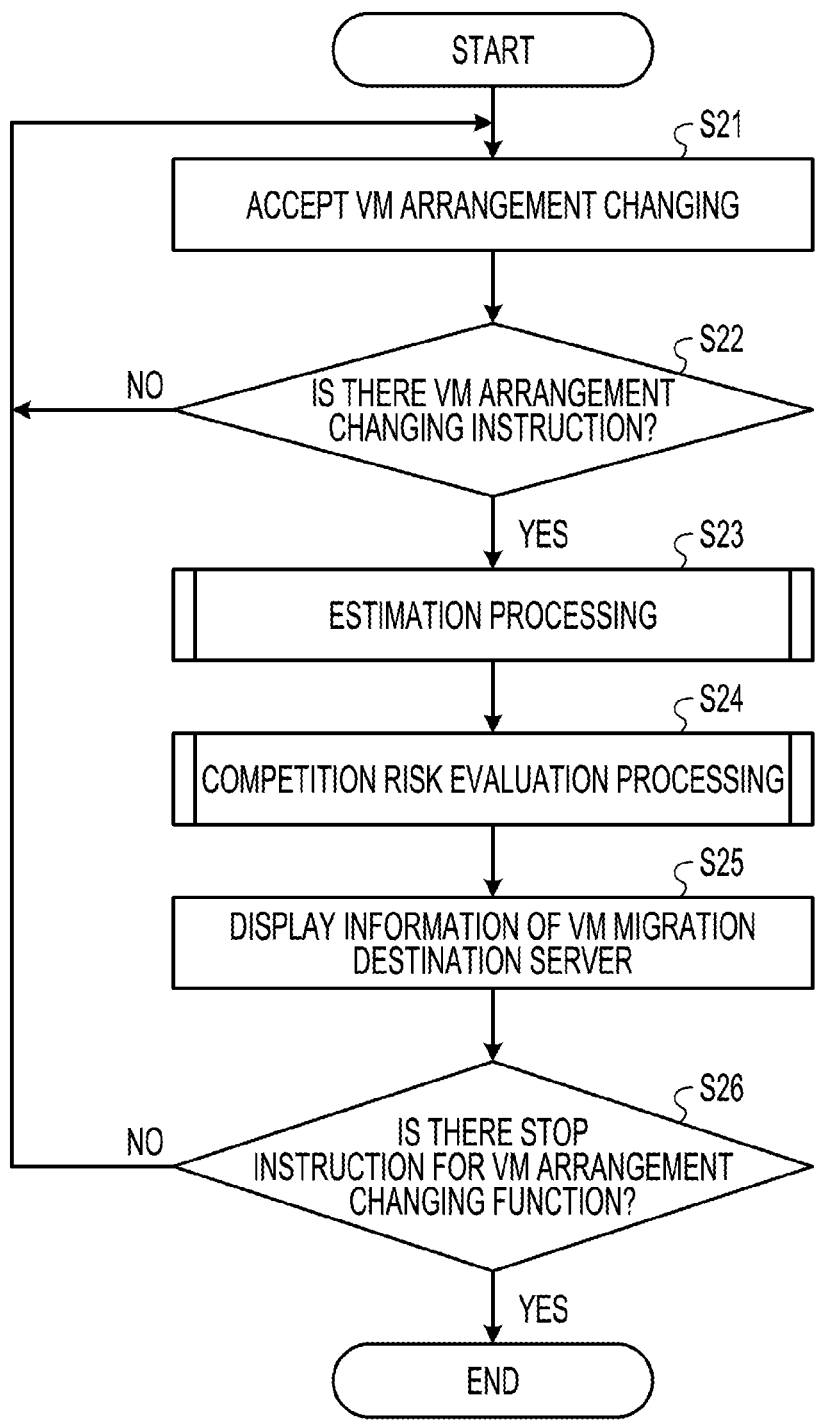
FIG. 18 is a flowchart illustrating the flow of a processing of changing VM arrangement.

FIG. 18 is a flowchart illustrating the flow of a processing of changing a VM arrangement. As illustrated in FIG. 18, the cloud infrastructure management apparatus 1 is in a state where VM arrangement changing is accepted (step S21), and determines whether there is a VM arrangement changing instruction (step S22). Then, when it is determined that there is no VM arrangement changing instruction, the cloud infrastructure management apparatus 1 continues to be in a state where the VM arrangement changing is accepted.

Meanwhile, when it is determined that there is a VM arrangement changing instruction, the cloud infrastructure management apparatus 1 performs an estimation processing of creating resource utilization rate estimation data (step S23), and performs a competition risk evaluation processing of evaluating a resource competition risk (step S24). Then, the cloud infrastructure management apparatus 1 displays information of a VM migration destination server (step S25). Then, the cloud infrastructure management apparatus 1 determines whether there is a stop instruction for a VM arrangement changing function (step S26). When it is determined that there is no stop instruction, the process returns to step S21. When it is determined that there is a stop instruction, the process ends.

In this manner, the cloud infrastructure management apparatus 1 may display the information of a server as a migration destination of a VM by performing the estimation processing and the competition risk evaluation processing when it is determined that there is a VM arrangement changing instruction.

Figure 19:
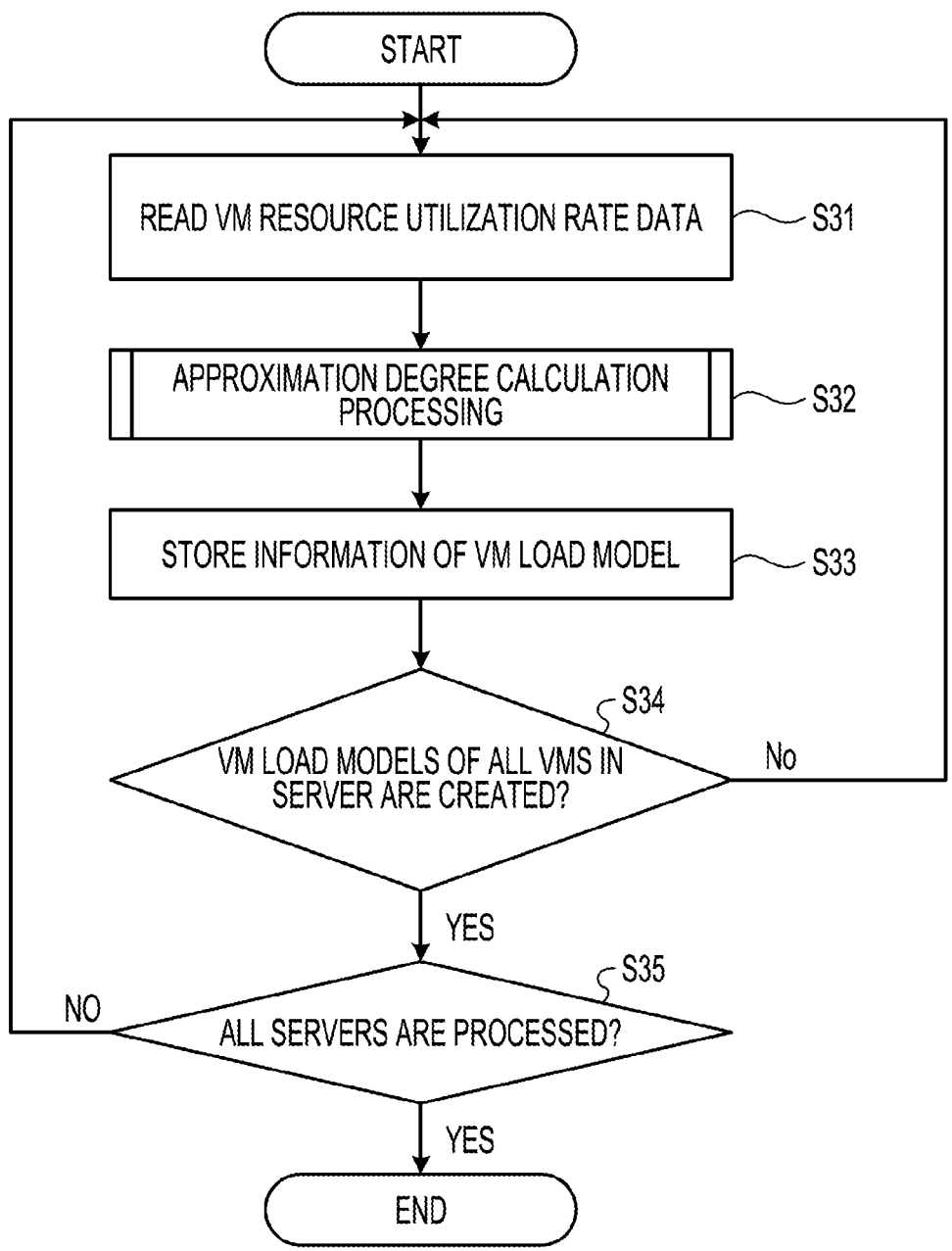
FIG. 19 is a flowchart illustrating the flow of a VM load modeling processing.

FIG. 19 is a flowchart illustrating the flow of the VM load modeling processing. The processing in FIG. 19 corresponds to the processing in step S3 of FIG. 16. As illustrated in FIG. 19, the VM load modeling circuit 12 reads VM resource utilization rate data (step S31), and performs an approximation degree calculation processing of calculating an approximation degree h of a VM load model (step S32).

Then, the VM load modeling circuit 12 stores information of the VM load model in the VM load model memory 13 (step S33), and determines whether VM load models of all VMs in a server have been created (step S34). Then, when it is determined that there is a VM whose VM load model has not been created, in the server, the VM load modeling circuit 12 returns to step S31, and performs a processing on the following VM.

Meanwhile, when it is determined that VM load models of all VMs in the server have been created, the VM load modeling circuit 12 determines whether all servers have been processed (step S35). When it is determined that there is a non-processed server, the VM load modeling circuit 12 returns to step S31, and performs a processing on the following server. Meanwhile, when it is determined that all servers have been processed, the VM load modeling circuit 12 ends the VM load modeling processing.

Figure 20:
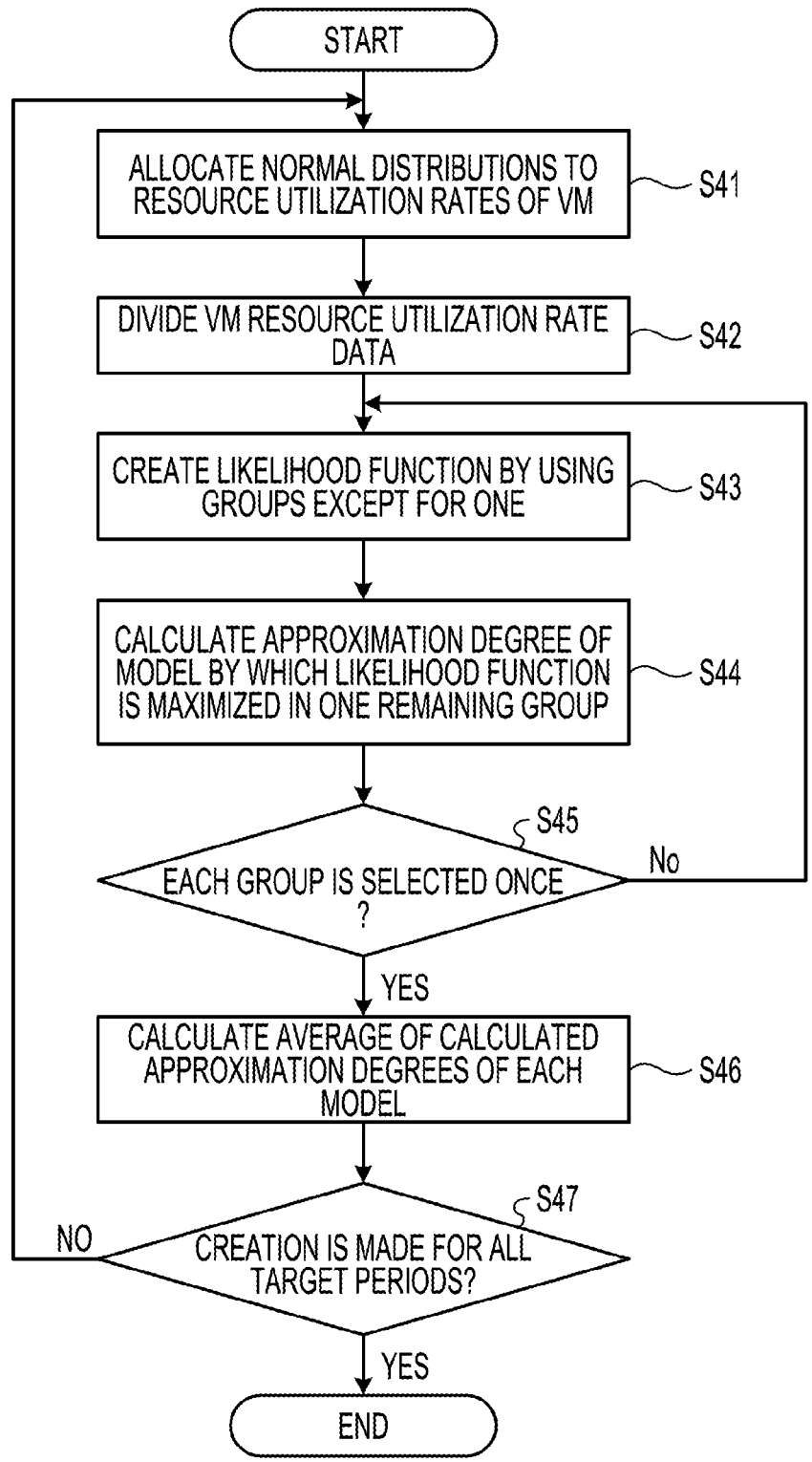
FIG. 20 is a flowchart illustrating the flow of an approximation degree calculation processing.

FIG. 20 is a flowchart illustrating the flow of the approximation degree calculation processing. As illustrated in FIG. 20, the VM load modeling circuit 12 allocates normal distributions to resource utilization rates of a VM (step S41). Then, the VM load modeling circuit 12 divides VM resource utilization rate data (step S42). For example, the VM load modeling circuit 12 divides the VM resource utilization rate data into four groups.

Then, the VM load modeling circuit 12 creates a likelihood function by using groups except for one (step S43), and calculates an approximation degree of a model by which the likelihood function is maximized, in the one remaining group (step S44). Then, the VM load modeling circuit 12 determines whether each group has been selected once (step S45), and returns to step S43 when it is determined that there is a non-selected group.

Meanwhile, when it is determined that each group has been selected once, the VM load modeling circuit 12 calculates an average of the calculated approximation degrees of each model (step S46), and sets the average as h. Then, the VM load modeling circuit 12 determines whether creation has been made for all target periods (step S47). When it is determined that there is a target period for which creation has not been made, the VM load modeling circuit 12 returns to step S41, and when it is determined that creation has been made for all target periods, the VM load modeling circuit 12 ends the approximation degree calculation processing.

In this manner, the VM load modeling circuit 12 may create a VM load model by calculating the approximation degree.

Figure 21:
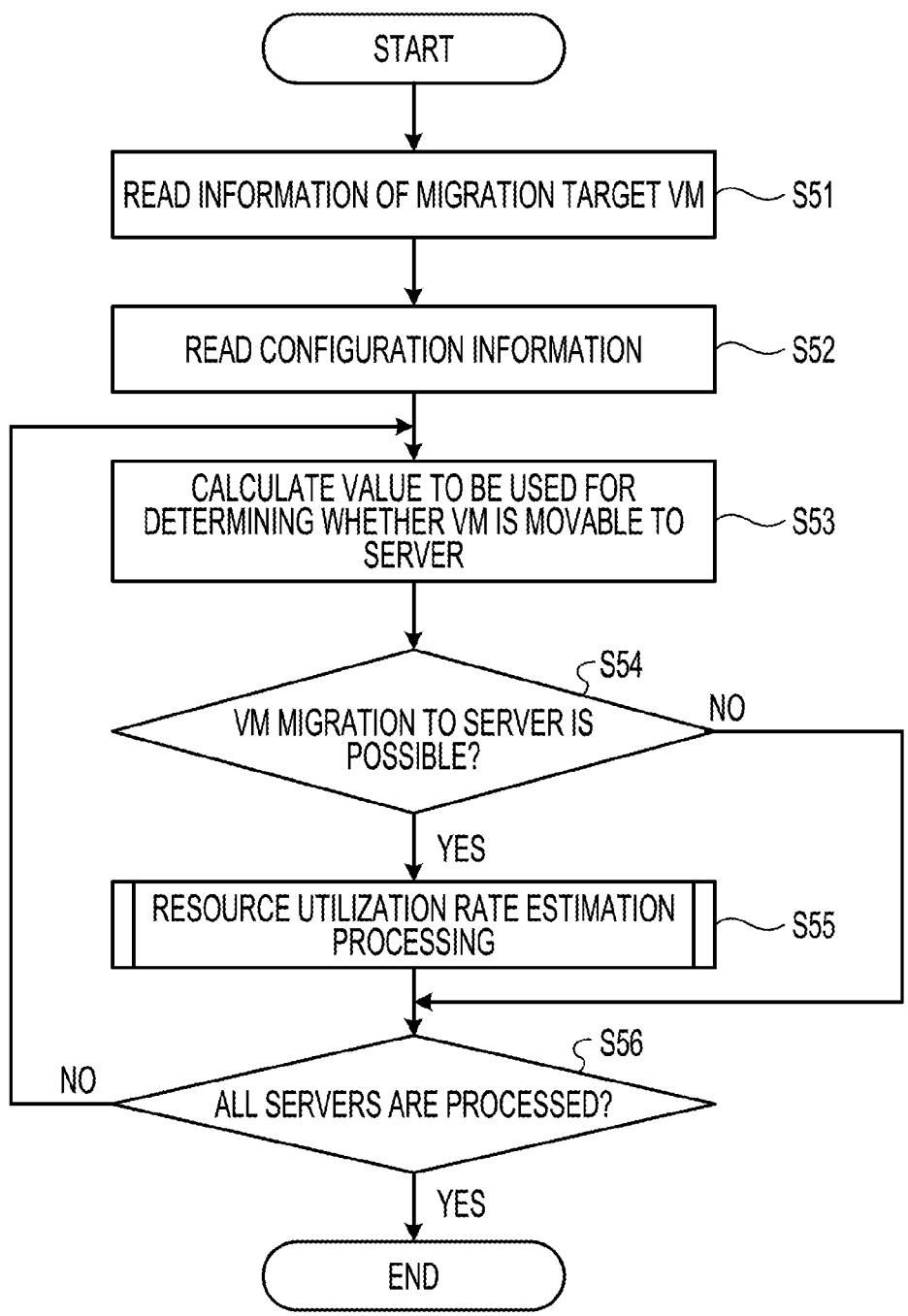
FIG. 21 is a flowchart illustrating the flow of an estimation processing.

FIG. 21 is a flowchart illustrating the flow of the estimation processing. The processing in FIG. 21 corresponds to the processing in step S23 of FIG. 18. As illustrated in FIG. 21, the estimation circuit 15 reads information of a migration target VM (step S51), and reads configuration information (step S52). Then, the estimation circuit 15 calculates a value to be used for determining whether a VM is movable to a server (step S53). Specifically, the estimation circuit 15 calculates the total number N of CPUs used by VMs (also including the migration target VM) running on the server, the total S of required memory amounts of the VMs (also including the migration target VM) running on the server, and a value M obtained by multiplying the number of CPUs of the server by an overcommit rate.

Then, the estimation circuit 15 determines whether VM migration to the server is possible (step S54). Specifically, the estimation circuit 15 determines whether N is smaller than M, and S is smaller than a memory amount of the server.

Then, when N is smaller than M, and S is smaller than the memory amount of the server, the estimation circuit 15 determines that VM migration to the server is possible, and performs a resource utilization rate estimation processing of creating resource utilization rate estimation data (step S55). Then, the estimation circuit 15 determines whether all servers have been processed (step S56), and then returns to step S53 when it is determined that there is a non-processed server, or ends the processing when it is determined that all servers have been processed. Meanwhile, the estimation circuit 15 may not perform the estimation processing on a server as a migration source of the migration target VM.

Figure 22:
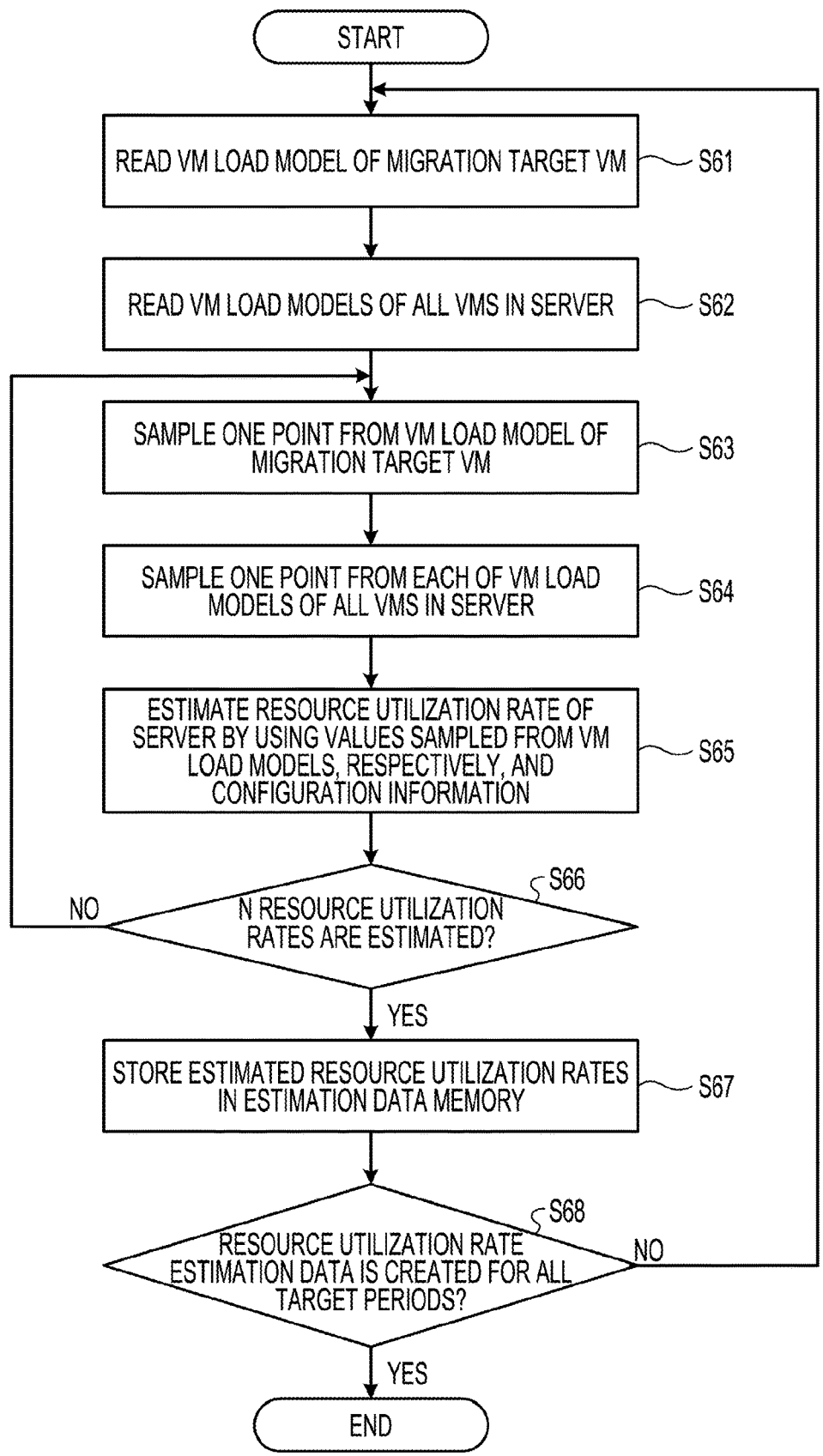
FIG. 22 is a flow chart illustrating the flow of a resource utilization rate estimation processing.

FIG. 22 is a flowchart illustrating the flow of the resource utilization rate estimation processing. As illustrated in FIG. 22, the estimation circuit 15 reads a VM load model of a migration target VM (step S61), and reads VM load models of all VMs in a server (step S62). Then, the estimation circuit 15 samples one point from the VM load model of the migration target VM (step S63), and samples one point from each of the VM load models of all VMs in the server (step S64).

Then, the estimation circuit 15 estimates a resource utilization rate of the server by using the values sampled from the VM load models, respectively, and configuration information (step S65). Then, the estimation circuit 15 determines whether n resource utilization rates have been estimated (step S66). Here, n is, for example, 5000. Then, when it is determined that n resource utilization rates have not been estimated, the estimation circuit 15 returns to step S63.

Meanwhile, when it is determined that n resource utilization rates have been estimated, the estimation circuit 15 stores the estimated resource utilization rates in the estimation data memory 16 (step S67). Then, the estimation circuit 15 determines whether resource utilization rate estimation data has been created for all target periods (step S68), and returns to step S61 when it is determined that the data has not been created, or ends the resource utilization rate estimation processing when it is determined that the data has been created.

In this manner, the estimation circuit 15 may create the resource utilization rate estimation data used for competition risk evaluation by performing the resource utilization rate estimation processing on a server to which the migration target VM is movable.

Figure 23:
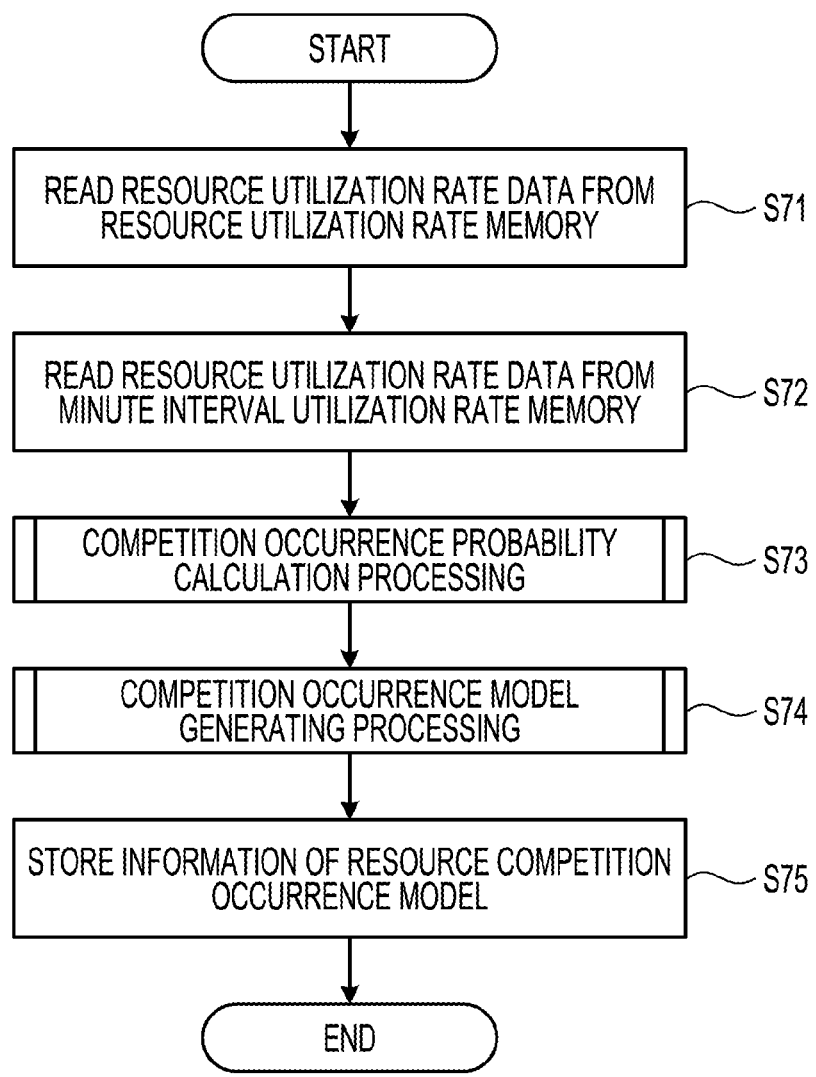
FIG. 23 is a flowchart illustrating the flow of a competition occurrence modeling processing.

FIG. 23 is a flowchart illustrating the flow of the competition occurrence modeling processing. The processing in FIG. 23 corresponds to the processing in step S13 of FIG. 17. As illustrated in FIG. 23, the competition occurrence modeling circuit 19 reads resource utilization rate data from the server resource utilization rate memory 17 (step S71), and reads resource utilization rate data from the minute interval utilization rate memory 18 (step S72).

Then, the competition occurrence modeling circuit 19 performs a competition occurrence probability calculation processing of calculating a resource competition occurrence probability (step S73), and performs a competition occurrence model generating processing of generating a resource competition occurrence model (step S74). Then, the competition occurrence modeling circuit 19 stores information of the resource competition occurrence model in the competition occurrence model memory 20 (step S75).

Figure 24:
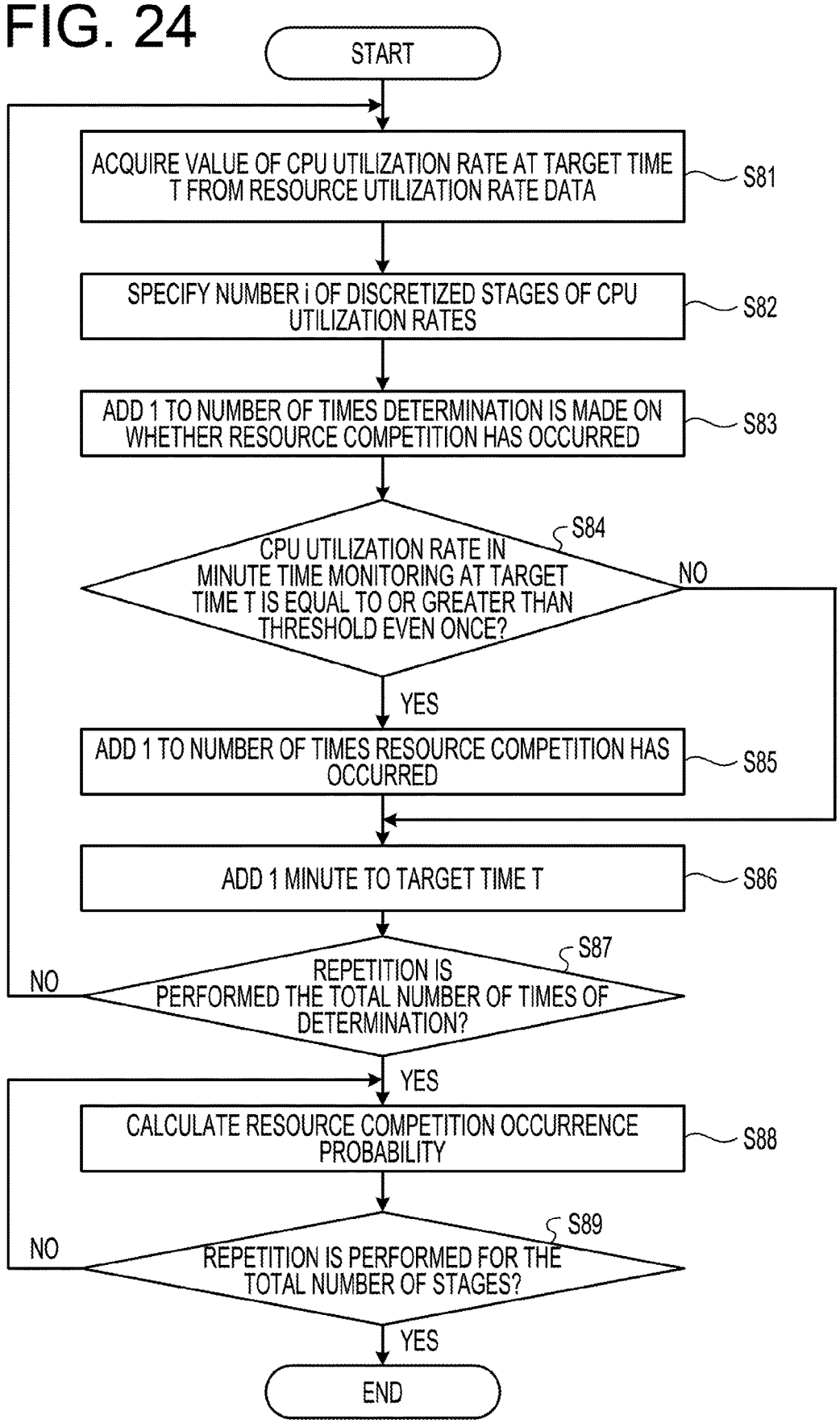
FIG. 24 is a flowchart illustrating the flow of a competition occurrence probability calculation processing.

FIG. 24 is a flowchart illustrating the flow of the competition occurrence probability calculation processing. As illustrated in FIG. 24, the competition occurrence modeling circuit 19 acquires a value of a CPU utilization rate at a target time T, from resource utilization rate data (step S81). Here, the resource utilization rate data is normal-interval resource utilization rate data read from the server resource utilization rate memory 17.

Then, the competition occurrence modeling circuit 19 specifies the number i of discretized stages of CPU utilization rates (step S82). For example, in the case of discretization in 10 stages, i is specified as 1 for CPU utilization rates of 0% or more and less than 10%, i is specified as 2 for CPU utilization rates of 10% or more and less than 20%, . . . , and i is specified as 10 for CPU utilization rates of 90% or more and less than 100%.

Then, the competition occurrence modeling circuit 19 adds 1 to the number of times $c_i$ determination is made on whether the resource competition has occurred (step S83), and determines whether a CPU utilization rate in minute time monitoring at the target time T is equal to or greater than a threshold even once (step S84). Here, the CPU utilization rates in the minute time monitoring at the target time T are CPU utilization rates from the target time T to T+1 minute, among minute-interval resource utilization rate data pieces read from the minute interval utilization rate memory 18. The threshold is, for example, 95%.

Then, when the CPU utilization rate in the minute time monitoring at the target time T is equal to or greater than the threshold even once, the competition occurrence modeling circuit 19 adds 1 to the number of times $d_i$ resource competition has occurred (step S85). Then, the competition occurrence modeling circuit 19 adds 1 minute to the target time T (step S86). Then, the competition occurrence modeling circuit 19 determines whether a repetition has been performed the total number of times of determination (step S87), and returns to step S81 when it is determined that the repetition has not been performed the total number of times of determination. Here, the total number of times of determination is, for example, 10000.

Meanwhile, when it is determined that the repetition has been performed the total number of times of determination, the competition occurrence modeling circuit 19 calculates a resource competition occurrence probability $p_i$ (step S88). Then, the competition occurrence modeling circuit 19 determines whether the repetition has been performed for the total number of stages (step S89), and returns to step S88 and calculates $p_i$ for another i when there is i for which $p_i$ has not been calculated. Meanwhile, when it is determined that the repetition has been performed for the total number of stages, the competition occurrence modeling circuit 19 ends the competition occurrence probability calculation processing.

Figure 25:
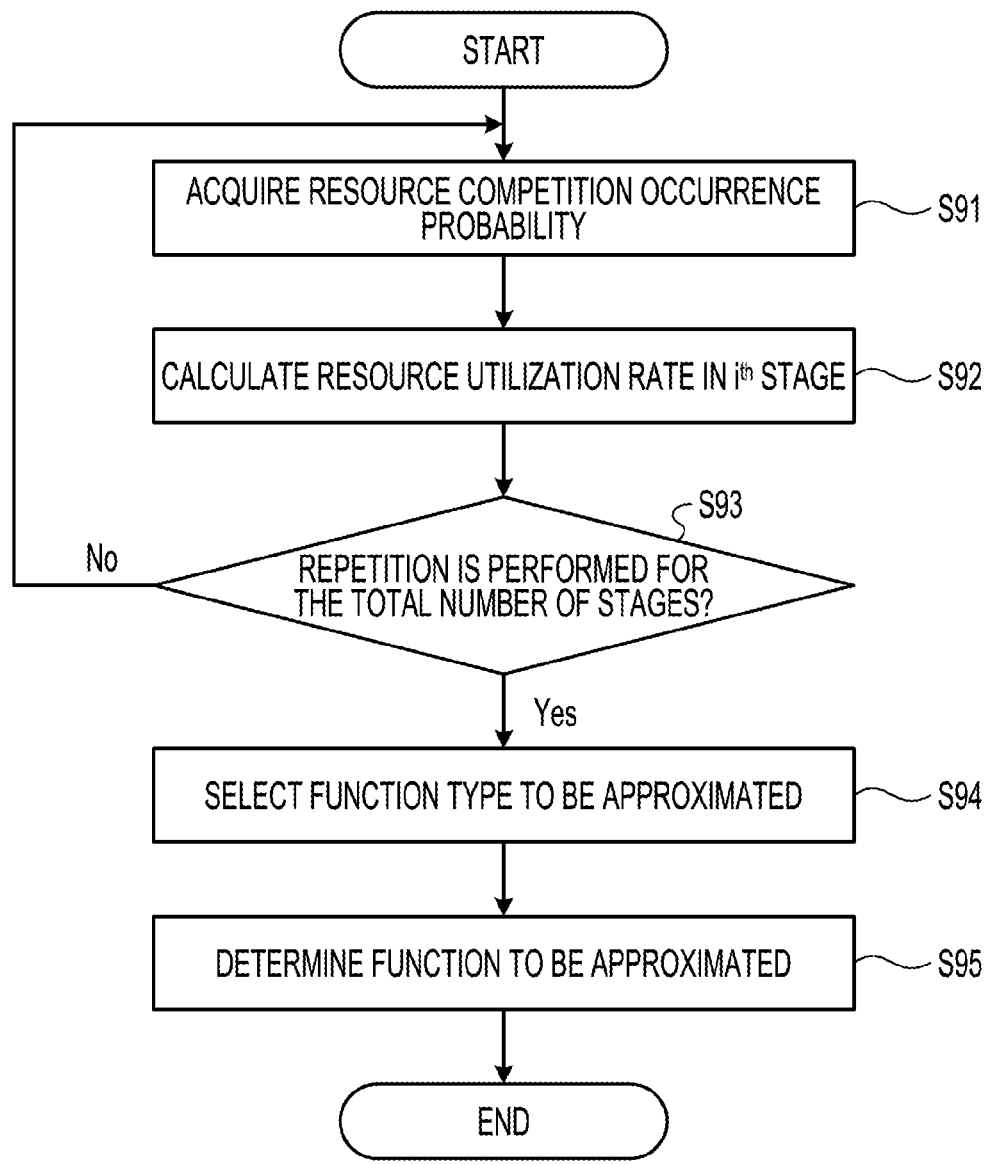
FIG. 25 is a flowchart illustrating the flow of a competition occurrence model generating processing.

FIG. 25 is a flowchart illustrating the flow of the competition occurrence model generating processing. As illustrated in FIG. 25, the competition occurrence modeling circuit 19 acquires a resource competition occurrence probability $p_i$ (step S91), and calculates a resource utilization rate $u_i$ in the $i^{th}$ stage (step S92). For example, in the case of discretization in 10 stages, it is assumed that $u_1$ is 5%, $u_2$ is 10%, . . . , and $u_{10}$ is 95%. Then, the competition occurrence modeling circuit 19 determines whether a repetition has been performed as many times as the number of all stages (step S93), and returns to step S91 when it is determined that the repetition has not been performed as many times as the number of all stages.

Meanwhile, when it is determined that the repetition has been performed as many times as the number of all stages, the competition occurrence modeling circuit 19 selects a function type to be approximated (step S94) and determines a function to be approximated by, for example, a least squares method from a relationship between $u_i$ and $p_i$, (step S95).

In this manner, the competition occurrence modeling circuit 19 may create a resource competition occurrence model by performing the competition occurrence probability calculation processing and the competition occurrence model generating processing.

Figure 26:
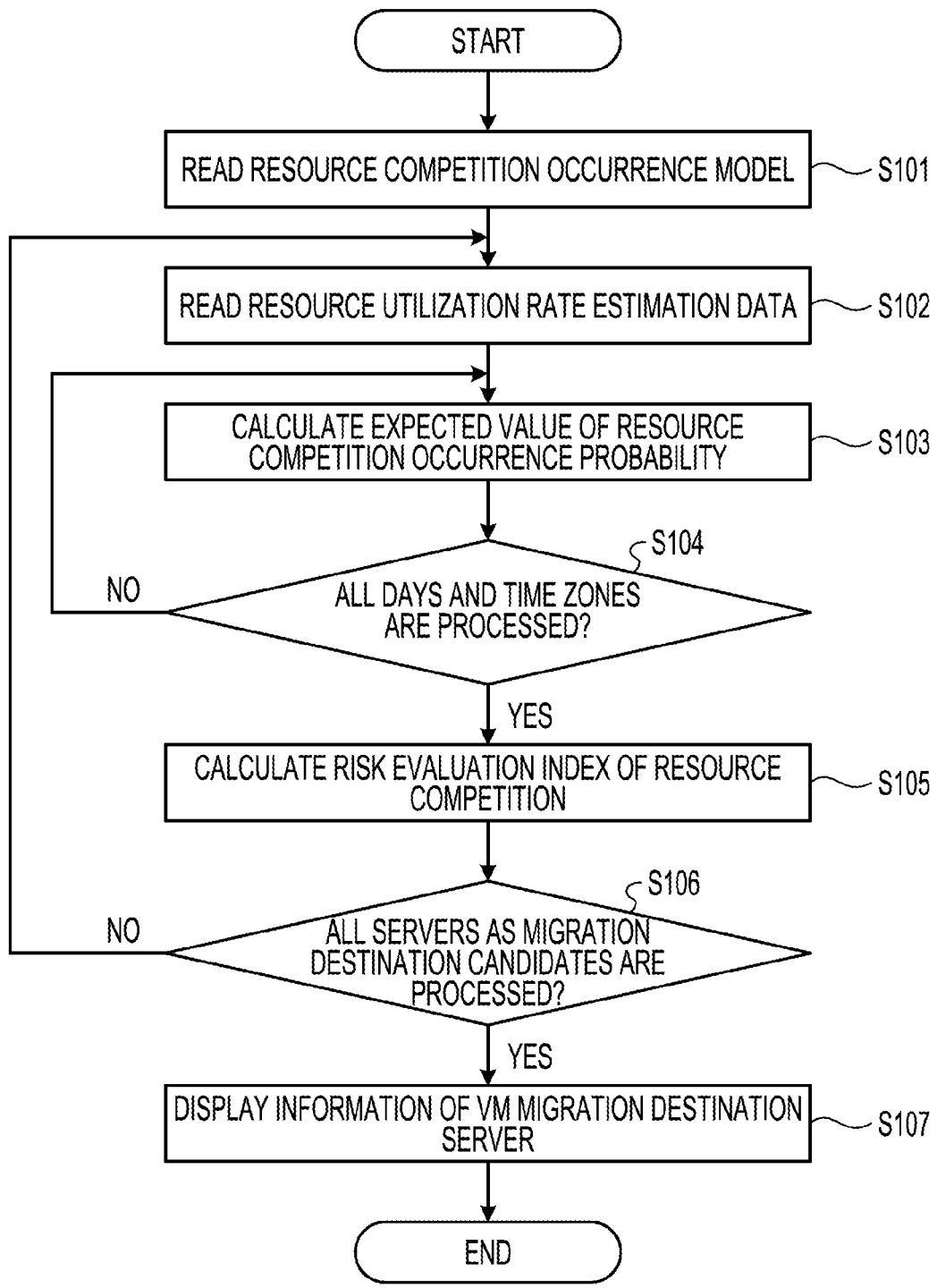
FIG. 26 is a flowchart illustrating the flow of a competition risk evaluation processing.

FIG. 26 is a flowchart illustrating the flow of the competition risk evaluation processing. The processing in FIG. 26 corresponds to the processing in step S24 of FIG. 18. As illustrated in FIG. 26, the competition risk evaluation circuit 21 reads a resource competition occurrence model (step S101), and reads resource utilization rate estimation data (step S102). Then, the competition risk evaluation circuit 21 calculates an expected value of a resource competition occurrence probability (step S103), and determines whether all days of the week and all time zones have been processed (step S104). Then, when it is determined that there is a non-processed day of the week or a non-processed time zone, the competition risk evaluation circuit 21 returns to step S103.

Meanwhile, when it is determined that all days of the week and all time zones have been processed, the competition risk evaluation circuit 21 calculates a risk evaluation index of resource competition (step S105), and determines whether all servers as migration destination candidates have been processed (step S106). Then, the competition risk evaluation circuit 21 returns to step S102 when it is determined that there is a non-processed migration destination candidate server, or displays information of a VM migration destination server when it is determined that all servers as migration destination candidates have been processed (step S107).

In this manner, the competition risk evaluation circuit 21 calculates expected values of resource competition occurrence probabilities on all days of the week and all time zones by using the resource competition occurrence model and the resource utilization rate estimation data, and calculates a risk evaluation index of resource competition from the expected values of resource competition occurrence probabilities on all days of the week and all time zones. Therefore, the competition risk evaluation circuit 21 may specify the migration destination server of a VM based on the risk evaluation index of resource competition.

As described above, in the embodiment, the VM load modeling circuit 12 creates a VM load model, for each VM, at one hour intervals for one week as a target. Then, upon receiving a specification instruction of a migration destination server of a virtual machine, the estimation circuit 15 creates resource utilization rate estimation data at one hour intervals for one week as a target based on VM load models of a VM group running on a server and a VM load model of the virtual machine serving as a migration target. The estimation circuit 15 creates the resource utilization rate estimation data for each of servers except for a migration source server. The competition occurrence modeling circuit 19 creates a resource competition occurrence model based on resource utilization rates of a server. Then, the competition risk evaluation circuit 21 calculates expected values of resource competition occurrence probabilities at one hour intervals for one week as a target, for each of servers except for a migration source server, based on the resource utilization rate estimation data and the resource competition occurrence model. Then, the competition risk evaluation circuit 21 calculates a risk evaluation index for each of servers except for a migration source server, based on a statistical value of resource competition occurrence probabilities calculated at one hour intervals for one week as a target. Then, the competition risk evaluation circuit 21 specifies a migration destination server based on the risk evaluation index. Therefore, the cloud infrastructure management apparatus 1 may specify a server as a migration destination of a virtual machine so as to suppress resource competition from occurring due to a temporary or spike-like high load.

In the embodiment, the VM load modeling circuit 12 associates normal distributions with respective values of resource utilization rates at a one hour interval, and adds all the normal distributions associated with the respective values, with respect to all values of the resource utilization rates at a one hour interval, thereby creating a VM load model. Therefore, the VM load modeling circuit 12 may create a VM load model which reflects a temporary high load.

In the embodiment, the estimation circuit 15 repeats sampling a resource utilization rate from a VM load model of each VM running on a server and adding all sampled resource utilization rates, so as to create resource utilization rate estimation data. Therefore, the estimation circuit 15 may create accurate resource utilization rate estimation data.

In the embodiment, the competition occurrence modeling circuit 19 determines whether the resource competition has occurred at a one-minute interval, based on resource utilization rates measured for a server at one-second intervals. Then, the competition occurrence modeling circuit 19 performs a processing of calculating a resource competition occurrence probability based on whether the resource competition has occurred at a one-minute interval with respect to 10 stages of values of resource utilization rates, thereby creating a resource competition occurrence model. Therefore, the competition occurrence modeling circuit 19 may model occurrence of resource competition due to a spike-like high load.

In the embodiment, the cloud infrastructure management apparatus 1 has been described. Meanwhile, the configuration of the cloud infrastructure management apparatus 1 may be implemented by software so as to obtain a migration destination recommendation program having the same function. Therefore, descriptions will be made on a computer that executes the migration destination recommendation program.

Figure 27:
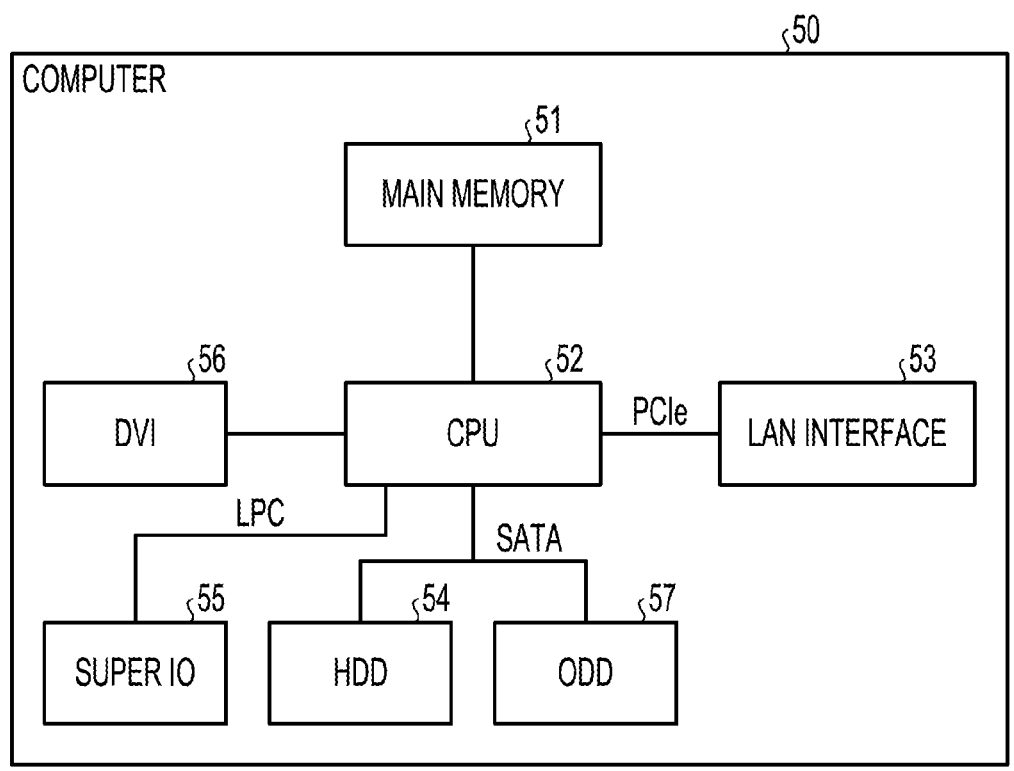
FIG. 27 is a view illustrating a hardware configuration of a computer that executes a migration destination recommendation program according to the embodiment.

FIG. 27 is a view illustrating a hardware configuration of a computer that executes a migration destination recommendation program according to the embodiment. As illustrated in FIG. 27, a computer 50 includes a main memory 51, a CPU 52, a local area network (LAN) interface 53, and a hard disk drive (HDD) 54. The computer 50 further includes a super input output (IO) 55, a digital visual interface (DVI) 56, and an optical disk drive (ODD) 57.

The main memory 51 is a memory that stores programs or program execution intermediate results, etc. The CPU 52 is a central processing device that reads and executes a program from the main memory 51. The CPU 52 includes a chip set including a memory controller.

The LAN interface 53 is an interface by which the computer 50 is connected to another computer via a LAN. The HDD 54 is a disk device that stores programs or data, and the super IO 55 is an interface by which an input device such as a mouse or a keyboard is connected. The DVI 56 is an interface by which a liquid crystal display device is connected, and the ODD 57 is a device that performs reading and writing of a DVD.

The LAN interface 53 is connected to the CPU 52 by PCI express (PCIe), and the HDD 54 and the ODD 57 are connected to the CPU 52 by the serial advanced technology attachment (SATA). The super IO 55 is connected to the CPU 52 by low pin count (LPC).

Then, a migration destination recommendation program to be executed in the computer 50 is stored in a DVD as an example of a recording medium readable by the computer 50, is read by the ODD 57 from the DVD, and is installed in the computer 50. Otherwise, the migration destination recommendation program is stored in a database, etc. of another computer system connected via the LAN interface 53, is read from such a database, and is installed in the computer 50. Then, the installed migration destination recommendation program is stored in the HDD 54, is read into the main memory 51, and is executed by the CPU 52.

In the embodiment, descriptions have been made on a case where a migration destination server of a VM is specified. Meanwhile, the cloud infrastructure management apparatus 1 may specify a placement destination server of a newly added VM. Here, it is assumed that a VM load model of the newly added VM is known. Otherwise, when a VM load model of the newly added VM is unknown, the cloud infrastructure management apparatus 1 may specify the placement destination server while excluding a load of the newly added VM.

In the embodiment, a target period is set to one week. Meanwhile, the target period may be another period such as one month. In the embodiment, a VM load model is created every hour by using resource utilization rates of a VM every hour. Meanwhile, the cloud infrastructure management apparatus 1 may create a VM load model at another time interval by using resource utilization rates of a VM at another time interval. In this case, the cloud infrastructure management apparatus 1 also performs creation of resource utilization rate estimation data, and calculation of an expected value of a resource competition occurrence probability, at another time interval.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An operation management apparatus comprising:
a memory; and
a processor coupled to the memory and configured to:
generate a virtual machine (VM) load model of a continuous probability distribution of a resource utilization rate of a virtual machine, for each virtual machine running on an information processing system,
generate resource utilization rate estimation data that is data obtained by estimating a probability distribution of a resource utilization rate of a physical machine, based on VM load models of a virtual machine group running on the physical machine and a VM load model of a first virtual machine, for each of physical machines except for a first physical machine on which the first virtual machine is running, when an instruction for specifying a migration destination physical machine of the first virtual machine is received,
generate a resource competition occurrence model that models a relationship between the resource utilization rate of the physical machine and a competition occurrence probability of a resource, based on the resource utilization rate of the physical machine,
calculate a statistical value of competition occurrence probabilities of the resource, for each of the physical machines except for the first physical machine, based on the resource utilization rate estimation data and the resource competition occurrence model,
specify the migration destination physical machine based on the statistical value calculated for each of the physical machines except for the first physical machine, and
output information of a specified migration destination physical machine.

2. The operation management apparatus according to claim 1, wherein the processor is configured to:
generate the VM load model at a first time interval for a predetermined period as a target,
generate the resource utilization rate estimation data at the first time interval for the predetermined period as a target,
calculate the statistical value at the first time interval for the predetermined period as a target, and calculates a risk evaluation index based on the statistical value calculated at the first time interval for the predetermined period as the target, and
specify the migration destination physical machine based on the risk evaluation index.

3. The operation management apparatus according to claim 2,
wherein the processor is configured to generate the VM load model by associating normal distributions with respective values of the resource utilization rate at the first time interval and adding all the normal distributions associated with the respective values with respect to all values of the resource utilization rate at the first time interval.

4. The operation management apparatus according to claim 2,
wherein the processor is configured to generate the resource utilization rate estimation data by repeating sampling the resource utilization rate from the VM load model of each virtual machine running on the physical machine and adding all sampled resource utilization rates.

5. The operation management apparatus according to claim 2,
wherein the processor is configured to generate the resource competition occurrence model by determining whether a resource competition has occurred for each third time interval including a plurality of second time intervals, based on resource utilization rates measured for the physical machine at the second time interval and performing a processing of calculating the competition occurrence probability based on whether the resource competition has occurred at each third time interval with respect to a plurality of stages based on values of the resource utilization rates.

6. The operation management apparatus according to claim 5,
wherein the resource is a CPU, the predetermined period is one week, the first time interval is one hour, the second time interval is one second, the third time interval is one minute, and the number of the stages is 10.

7. A migration destination definition method executed by a processor included in an operation management apparatus, the migration destination definition method comprising:
creating a virtual machine (VM) load model of a continuous probability distribution of a resource utilization rate of a virtual machine, for each virtual machine running on an information processing system;
creating resource utilization rate estimation data that is data obtained by estimating a probability distribution of a resource utilization rate of a physical machine, based on VM load models of a virtual machine group running on the physical machine and a VM load model of a first virtual machine, for each of physical machines except for a first physical machine on which the first virtual machine is running, when an instruction for specifying a migration destination physical machine of the first virtual machine is received;
creating a resource competition occurrence model that models a relationship between the resource utilization rate of the physical machine and a competition occurrence probability of a resource, based on the resource utilization rate of the physical machine;
calculating a statistical value of competition occurrence probabilities of the resource, for each of the physical machines except for the first physical machine, based on the resource utilization rate estimation data and the resource competition occurrence model;
specifying the migration destination physical machine based on the statistical value calculated for each of the physical machines except for the first physical machine; and
outputting information of a specified migration destination physical machine.

8. A non-transitory computer-readable storage medium storing a program that causes a processor included in an operation management apparatus to execute a process, the process comprising:
generating a virtual machine (VM) load model of a continuous probability distribution of a resource utilization rate of a virtual machine, for each virtual machine running on an information processing system;

generating resource utilization rate estimation data that is data obtained by estimating a probability distribution of a resource utilization rate of a physical machine, based on VM load models of a virtual machine group running on the physical machine and a VM load model of a first virtual machine, for each of physical machines except for a first physical machine on which the first virtual machine is running, when an instruction for specifying a migration destination physical machine of the first virtual machine is received;

generating a resource competition occurrence model that models a relationship between the resource utilization rate of the physical machine and a competition occurrence probability of a resource, based on the resource utilization rate of the physical machine;

calculating a statistical value of competition occurrence probabilities of the resource, for each of the physical machines except for the first physical machine, based on the resource utilization rate estimation data and the resource competition occurrence model;

specifying the migration destination physical machine based on the statistical value calculated for each of the physical machines except for the first physical machine; and outputting information of a specified migration destination physical machine.

* * * * *